(12) United States Patent
Yang et al.

(10) Patent No.: US 12,516,192 B2
(45) Date of Patent: Jan. 6, 2026

(54) MODIFIED SILOXANE RUBBERY COMPOSITE MEMBRANES FOR $C_{3+}$ HEAVY HYDROCARBON SEPARATION

(71) Applicant: Saudi Arabian Oil Company, Dhahran (SA)

(72) Inventors: Junyan Yang, Acton, MA (US); Milind M. Vaidya, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 543 days.

(21) Appl. No.: 17/992,228

(22) Filed: Nov. 22, 2022

(65) Prior Publication Data

US 2024/0182717 A1  Jun. 6, 2024

(51) Int. Cl.
| | |
|---|---|
| *C08L 83/06* | (2006.01) |
| *B01D 53/22* | (2006.01) |
| *B01D 69/02* | (2006.01) |
| *B01D 69/10* | (2006.01) |
| *B01D 69/12* | (2006.01) |
| *B01D 71/70* | (2006.01) |

(52) U.S. Cl.
CPC ............ *C08L 83/06* (2013.01); *B01D 53/228* (2013.01); *B01D 69/02* (2013.01); *B01D 69/10* (2013.01); *B01D 69/125* (2013.01); *B01D 71/70* (2013.01); *B01D 2257/702* (2013.01); *B01D 2323/12* (2013.01); *B01D 2323/30* (2013.01)

(58) Field of Classification Search
CPC ............ C08L 3/06; C08G 77/44; C08G 77/50
See application file for complete search history.

(56) References Cited

U.S. PATENT DOCUMENTS

| | | | | |
|---|---|---|---|---|
| 3,440,214 | A * | 4/1969 | Quaal | C08G 77/04 |
| | | | | 528/901 |
| 7,399,581 | B2 | 7/2008 | Allen et al. | |
| 10,293,301 | B2 | 5/2019 | Yang et al. | |
| 10,654,005 | B2 | 5/2020 | Kodama et al. | |
| 10,968,317 | B2 * | 4/2021 | Gohndrone | C08G 77/08 |
| 11,161,939 | B2 * | 11/2021 | Zhou | C08G 77/38 |
| 2008/0134884 | A1 | 6/2008 | Sammons et al. | |
| 2008/0149561 | A1 | 6/2008 | Chu et al. | |

(Continued)

FOREIGN PATENT DOCUMENTS

JP   2012187452   10/2012

OTHER PUBLICATIONS

Baumann et al., "Synthesis and characterization of novel PDMS Nanocomposites Using POSS Derivatives as Cross-Linking Filler," Journal of Polymer Science Part A Polymer Chemistry, 47:10, May 2009, 2589-2596, 8 pages.

(Continued)

*Primary Examiner* — Margaret G Moore
(74) *Attorney, Agent, or Firm* — Fish & Richardson P.C.

(57) ABSTRACT

This disclosure relates to siloxane membrane materials and polymeric membranes containing the siloxane membrane materials. The siloxane membrane materials are crosslinked with silanol polymers having backbones functionalized with bulky or rigid substituents. This disclosure also relates to methods of using the membranes for natural gas liquid recovery, such as removal and recovery of $C_{3+}$ hydrocarbons from natural gas.

31 Claims, 17 Drawing Sheets

(56) References Cited

U.S. PATENT DOCUMENTS

| | | | |
|---|---|---|---|
| 2013/0126432 A1* | 5/2013 | Kreiter | B01D 67/0079 |
| | | | 210/259 |
| 2016/0159989 A1 | 6/2016 | Kang et al. | |
| 2016/0220967 A1* | 8/2016 | Kurahashi | C08G 77/04 |
| 2018/0221813 A1* | 8/2018 | Yang | B01D 53/228 |
| 2018/0280892 A1* | 10/2018 | Harada | B01D 69/02 |
| 2019/0070566 A1 | 3/2019 | Kidambi et al. | |
| 2020/0153040 A1 | 5/2020 | Joo et al. | |
| 2020/0231756 A1* | 7/2020 | Gohndrone | C08G 77/20 |
| 2021/0309808 A1* | 10/2021 | Zhou | C08G 77/12 |
| 2022/0213271 A1 | 7/2022 | Yang et al. | |
| 2022/0251304 A1* | 8/2022 | Zhu | C08G 77/20 |
| 2025/0145771 A1* | 5/2025 | Aso | C09D 183/14 |

OTHER PUBLICATIONS

Belcher et al., "Novel low-temperature POSS-containing siloxane elastomers," NASA Technical Reports, 2008, 11 pages.

Chen et al., "Synergistic effect between POSS and fumed silica on thermal stabilities and mechanical properties of room temperature vulcanized (RTV) silicone rubbers," Polymer Degradation and Stability, 97:3, 2012, 303-315, 8 pages.

Chen et al., "Synthesis and characterization of novel room temperature vulcanized (RTV) silicon rubbers using octa[(trimethoxysilyl)ethyl]-POSS as crosslinker," Reactive and Functional Polymers, 71(4), 2011, 502-511, 11 pages.

Grushevenko et al., "Silicone rubbers with alkyl side groups for C3+ hydrocarbon separation," Reactive and Functional Polymers, 2019, 134:156-165, 10 pages.

Hasik et al., "Polysiloxane—POSS systems as precursors to SiCO ceramics," Reactive and Functional Polymers, 73:5, May 2013, 779-788, 10 pages.

Isayeva et al., "Amphiphilic membranes crosslinked and reinforced by POSS," Journal of Polymer Science Part A: Polymer Chemistry, 42:17, Sep. 2004, 4337-4352, 16 pages.

Liu et al., "Synthesis and application of PDMS/OP-POSS membrane for the pervaporative recovery of n-butyl acetate and ethyl acetate from aqueous media," Journal of Membrane Science, 591, Dec. 2019, 16 pages.

Liu et al., "Preparation and thermal degradation behavior of room temperature vulcanized silicone rubber-g-polyhedral oligomeric silsesquioxane," Polymer, 54:22, Oct. 2013, 6140-6149, 10 pages.

Madhavan et al., "Structure-gas transport property relationships of poly (dimethylsiloxane-urethane) nanocomposite membranes," Journal of Membrane Science, 342:1-2, Oct. 2009, 291-299, 9 pages.

Mushardt et al., "Development of solubility selective mixed matrix membranes for gas separation," Chemie Ingenieur Technick, 2014, 86:83-91, 9 pages.

Mushardt et al., "Detailed investigation of separation performance of a MMM for removal of higher hydrocarbons under varying operating conditions," Membranes, 2016, 6:16-113, 13 pages.

Pan et al., "Synthesis and characterization of fillers of controlled structure based on polyhedral oligomeric silsesquioxane cages and their use in reinforcing siloxane elastomers," J. Polym. Sci.: Part B: Polym. Phys., 41:24, 2003, 3314-3323, 10 pages.

Raftopoulos et al., "Segmental dynamics in hybrid polymer/POSS nanomaterials," Progress in Polymer Science, 52, 2016, 136-187, 52 pages.

Rao et al., "Preparation and oxygen/nitrogen permeability of PDMS crosslinked membrane and PDMS/tetraethoxysilicone hybrid membrane," Journal of Membrane Science, 303:1, 2007, 132-139, 8 pages.

Rezakazemi et al., "Synthesis and gas transport properties of crosslinked poly(dimethylsiloxane) nanocomposite membranes using octatrimethylsiloxy POSS nanoparticles," J. Natural Gas Sci. & Eng., 30, 2016, 10-18, 37 pages.

Semenova et al., "Polymer membranes for hydrocarbon separation and removal," Journal of Membrane Science, 2004, 231(1-2):189-207, 19 pages.

Yang et al., "Modified rubbery siloxane membranes for enhanced C3+ hydrocarbon recovery from natural gas: Pure and multicomponent gas permeation evaluation," Separation and Purification Technology, 2020, 242:116774, 28 pages.

Yang et al., "Thermal stability enhancement mechanism of poly(dimethylsiloxane) composite by incorporating octavinyl polyhedral oligomeric silsesquioxane," Polymer Degradation and Stability, 98:1, Jan. 2013, 109-114, 6 pages.

Zhan et al., "Enhanced pervaporation performance of PDMS membranes based on nanosized Octa[(trimethoxysilyl)ethyl]-POSS as macro-crosslinker," Applied Surface Science, 473, Apr. 2019, 785-798, 37 pages.

Zhang et al., "Effect of polyhedral oligomeric silsesquioxane (POSS) on crystallization behaviors of POSS/polydimethylsiloxane rubber nanocomposites," Royal Society of Chemistry, RSC Advances, Apr. 2014, 6275-6283, 9 pages.

* cited by examiner

MODIFIED SILOXANE RUBBERY COMPOSITE MEMBRANES FOR $C_{3+}$ HEAVY HYDROCARBON SEPARATION

TECHNICAL FIELD

This document relates to crosslinked siloxane composite membrane materials and membranes containing the crosslinked siloxane materials that have been functionalized with rigid or bulky substituent groups. The document also relates to methods of using the membranes for natural gas liquid recovery, such as removal and recovery of $C_{3+}$ hydrocarbons from natural gas.

BACKGROUND

Natural gas liquids (NGLs) are a group of hydrocarbons ($C_{2+}$) that include ethane ($C_2H_6$), propane ($C_3H_8$), butane ($C_4H_{10}$), isobutane, and natural gasoline, with a wide variety of applications from specialized fuels to petrochemical feedstocks to making products like plastic and fertilizers. Thus, recovering heavy hydrocarbons ($C_{3+}$) from natural gas is important economically.

Current separation technology involves a sequence of cooling and condensation, or absorption (for example, cryogenic distillation, pressure swing adsorption, or other energetically intensive refrigeration processes). Commercially, polydimethylsiloxane (PDMS)-based rubbery siloxane membranes have been applied for $C_{3+}$ hydrocarbons removal from raw natural gas. The high permeability of PDMS allows for the simultaneous rejection of $N_2$ and for the concentration of $C_{3+}$ hydrocarbons in membrane permeate streams; however, conventional PDMS membranes with flexible dimethylsiloxane $(Me_2SiO)_x$ chains exhibit low selectivities of $C_{3+}$ to methane (for example, $C_{3+}/CH_4$ selectivity) due to high degrees of swelling under hydrocarbon-rich natural gas feed streams and operating conditions. Methods of modifying the membranes in order to increase separation performance have been reported, but there is still a need for more efficient rubbery siloxane membranes with higher $C_{3+}/CH_4$ selectivity that can achieve enhanced $C_{3+}$ hydrocarbons recovery from natural gas while reducing capital and operating expenditures.

SUMMARY

Provided in the present disclosure is a polymer material that contains a repeat unit of Formula (I):

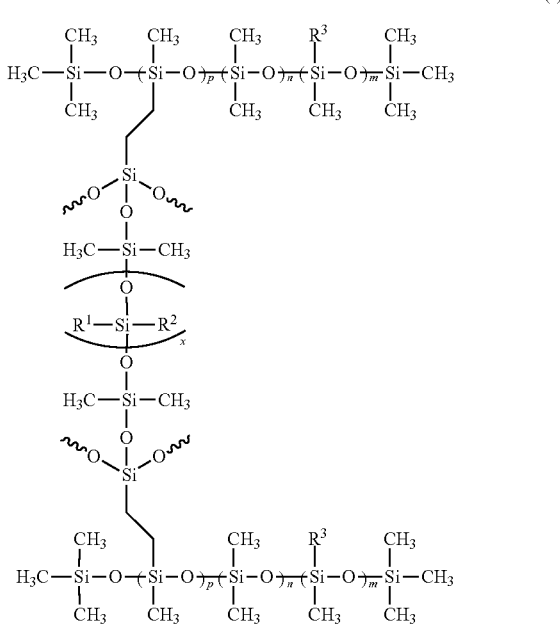

Formula (I)

wherein:

$R^1$ is selected from the group consisting of phenyl, —($C_1$-$C_6$ alkyl), and —($C_1$-$C_6$ haloalkyl);

$R^2$ is selected from the group consisting of phenyl, —($C_1$-$C_6$ alkyl), and —($C_1$-$C_6$ haloalkyl);

$R^3$ is selected from the group consisting of phenyl and —($C_6$-$C_{18}$ alkyl);

m is an integer between 0.35 and 0.4;

p is an integer between 0.03 and 0.05;

n is (1−m−p); and x is an integer between 0.03 and 0.05.

In some embodiments of the polymer material, $R^1$ is selected from the group consisting of phenyl and —$CH_2CH_2CF_3$.

In some embodiments of the polymer material, $R^2$ is selected from the group consisting of phenyl and methyl.

In some embodiments of the polymer material, $R^1$ and $R^2$ are each phenyl. In some embodiments, $R^1$ is —$CH_2CH_2CF_3$ and $R^2$ is methyl. In some embodiments, $R^1$ is -phenyl and $R^2$ is methyl.

In some embodiments of the polymer material, $R^3$ is —($C_8$-$C_{10}$ alkyl). In some embodiments, $R^3$ is —($C_8$ alkyl).

Also provided in the present disclosure is a crosslinked siloxane composite membrane that contains a polymer material that contains a repeat unit of Formula (I):

Formula (I)

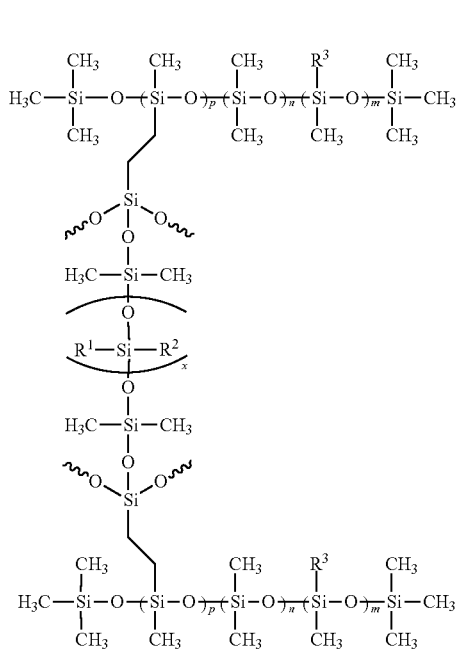

wherein:
R$^1$ is selected from the group consisting of phenyl, —(C$_1$-C$_6$ alkyl), and —(C$_1$-C$_6$ haloalkyl);
R$^2$ is selected from the group consisting of phenyl, —(C$_1$-C$_6$ alkyl), and —(C$_1$-C$_6$ haloalkyl);
R$^3$ is selected from the group consisting of phenyl and —(C$_6$-C$_{18}$ alkyl);
m is an integer between 0.35 and 0.4;
p is an integer between 0.03 and 0.05;
n is (1−m−p); and
x is an integer between 0.03 and 0.05.

In some embodiments of the membrane, R$^1$ is selected from the group consisting of phenyl and —CH$_2$CH$_2$CF$_3$.

In some embodiments of the membrane, R$^2$ is selected from the group consisting of phenyl and methyl.

In some embodiments of the membrane, R$^1$ and R$^2$ are each phenyl. In some embodiments, R$^1$ is —CH$_2$CH$_2$CF$_3$ and R$^2$ is methyl. In some embodiments, R$^1$ is -phenyl and R$^2$ is methyl.

In some embodiments of the membrane, R$^3$ is —(C$_8$-C$_{10}$ alkyl). In some embodiments, R$^3$ is —(C$_8$ alkyl).

In some embodiments, the membrane is cast on a polyacrylonitrile (PAN) support.

In some embodiments, the membrane has a crosslinking density of about 5×10$^{-5}$ mol/mL to about 15×10$^{-5}$ mol/mL.

In some embodiments, the membrane has a C$_3$H$_8$/CH$_4$ single gas selectivity (αC$_3$H$_8$/CH$_4$) of about 7 to about 25 at feed temperature of 20° C. and feed pressure of 1 bar.

In some embodiments, the membrane has a C$_4$H$_{10}$/CH$_4$ single gas selectivity (αC$_4$H$_{10}$/CH$_4$) of about 25 to about 100 at feed temperature of 20° C. and feed pressure of 1 bar.

Also provided in the present disclosure is a method of separating C$_{3+}$ hydrocarbons from natural gas, the method including providing a crosslinked siloxane composite membrane that contains a polymer material that contains a repeat unit of Formula (I):

Formula (I)

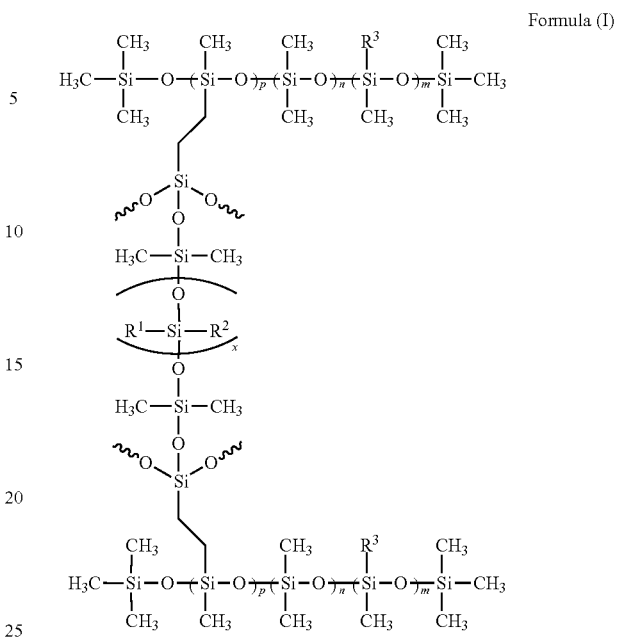

wherein:
R$^1$ is selected from the group consisting of phenyl, —(C$_1$-C$_6$ alkyl), and —(C$_1$-C$_6$ haloalkyl);
R$^2$ is selected from the group consisting of phenyl, —(C$_1$-C$_6$ alkyl), and —(C$_1$-C$_6$ haloalkyl);
R$^3$ is selected from the group consisting of phenyl and —(C$_6$-C$_{18}$ alkyl);
m is an integer between 0.35 and 0.4;
p is an integer between 0.03 and 0.05;
n is (1−m−p); and
x is an integer between 0.03 and 0.05.

In some embodiments of the method, R$^1$ is selected from the group consisting of phenyl and —CH$_2$CH$_2$CF$_3$.

In some embodiments of the method, R$^2$ is selected from the group consisting of phenyl and methyl.

In some embodiments of the method, R$^1$ and R$^2$ are each phenyl. In some embodiments, R$^1$ is —CH$_2$CH$_2$CF$_3$ and R$^2$ is methyl. In some embodiments, R$^1$ is -phenyl and R$^2$ is methyl.

In some embodiments of the method, R$^3$ is —(C$_8$-C$_{10}$ alkyl). In some embodiments, R$^3$ is —(C$_8$ alkyl).

In some embodiments of the method, the crosslinked siloxane composite membrane is cast on a polyacrylonitrile (PAN) support.

In some embodiments of the method, the crosslinked siloxane composite membrane has a crosslinking density of about 5×10$^{-5}$ mol/mL to about 30×10$^{-5}$ mol/mL.

In some embodiments of the method, the C$^{3+}$ hydrocarbons are more permeable through the crosslinked siloxane composite membrane than methane.

DESCRIPTION OF DRAWINGS

FIG. 2A depicts a composite membrane material containing a silanol-terminated polydiphenylsiloxane crosslinker. FIG. 2B depicts a composite membrane material containing a silanol-terminated polytrifluoropropylmethylsiloxane crosslinker.

FIG. 10A shows the comparison of $C_3H_8/CH_4$ selectivity vs. $C_3H_8$ permeability and FIG. 10B shows the comparison of $C_4H_{10}/CH_4$ selectivity vs. $C_4H_{10}$ permeability, where an open circle represents PDMS, a filled-in circle represents POMS, a triangle represents Ter-PDMS-2P, an upside-down triangle represents Ter-PDMS-3F, and a pentagon represents Ter-PDMS.

DETAILED DESCRIPTION

Figure 1:
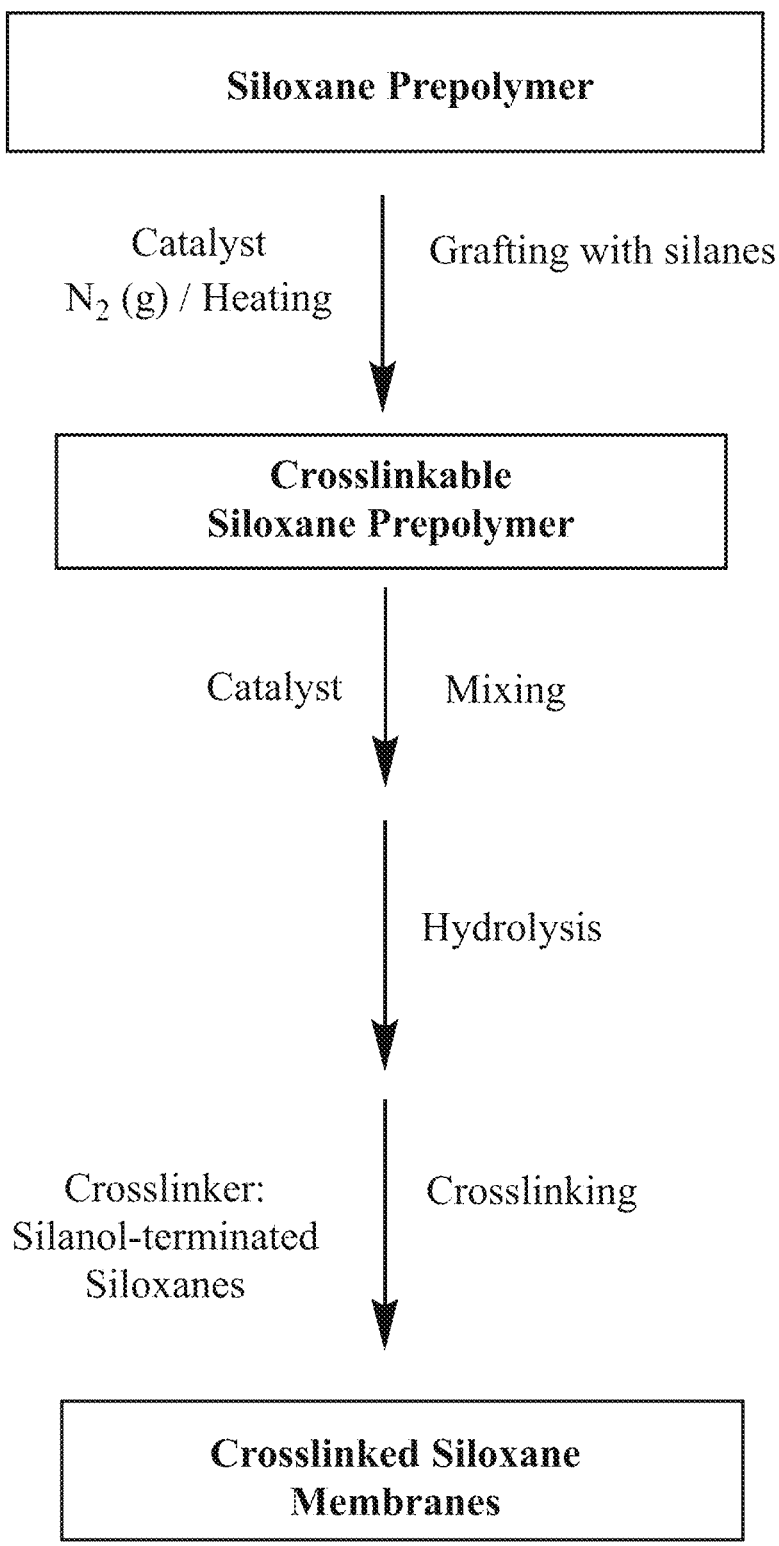
FIG. 1 is a flowchart showing the steps for preparing exemplary crosslinked siloxane rubbery membranes.

Provided in the present disclosure are siloxane rubbery membrane materials and membranes containing the materials. The siloxane rubbery membrane materials are crosslinked with a silanol functional polymer that contains rigid substituent groups or bulky substituent groups in the backbone. In some embodiments, the substituent groups include phenyl or trifluoropropyl groups. Also provided in the present disclosure is a method for using a silanol functional polymer as a crosslinker to produce a chemically crosslinked siloxane rubbery membrane material with enhanced separation performance for $C_{3+}$ hydrocarbons removal from natural gas. In some embodiments, the composite membranes are prepared as a thin film onto microporous polyacrylonitrile (PAN) supports through a hydrolysis-polycondensation process of modified crosslinkable vinylmethylsiloxane terpolymers and silanol-terminated PDMS crosslinkers with rigid and/or large (or bulky) substituent groups.

Also provided are methods for making and using such membranes for enhanced NGL recovery from natural gas. The crosslinked siloxane membranes of the present disclosure demonstrate significant improvement in membrane separation performance ($C_{3+}/CH_4$ selectivity) at feed pressure up to 800 psi under industrially relevant feed stream conditions ($C_1$-$C_5$ hydrocarbons, $CO_2$, $N_2$, toluene/xylene), compared to conventional PDMS and crosslinked siloxane membranes without the crosslinker functionalized with the rigid or large substituent groups.

Crosslinked Composite Siloxane Membranes

Provided in the present disclosure are composite membranes for separating heavy hydrocarbons from natural gas. The membranes contain polymers having a crosslinked structure that imparts higher permeability to heavy carbons and higher selectivity to heavy hydrocarbons over lighter components of natural gas as compared to other PDMS rubbery membranes that are not so crosslinked. The polymer materials of the composite membranes are prepared using chemical reactions such as an addition reaction between silicon-hydrogen (Si—H) bonds and vinyl groups, a grafting of a second polysiloxane copolymer to the backbone of the polymer material, a hydrolysis, and a polycondensation of trimethylalkoxysiloxane polymers and silanol functional polymers. The polymer materials include side-chain modifications such as rigid or bulky groups on a PDMS backbone.

Thus, in some embodiments, provided are silanol functional polymers that contain rigid or large (bulky) substituent groups in the backbone chains as a crosslinker that are incorporated into a membrane matrix to improve gas transport properties in natural gas separation, due to reduced glass transition temperatures ($T_g$) or increased crosslinked densities of the polymers. In some embodiments, the substituent groups include phenyl groups. In some embodiments, the substituent groups include haloalkyl groups, such as trifluoropropyl groups.

The chemical crosslinking of the silanol functional polymer crosslinkers with modified vinylmethylsiloxane terpolymers grafted with trimethoxysilicon (—Si(OCH$_3$)$_3$—) groups produces modified crosslinked siloxane rubbery membranes which display high selectivity for $C_{3+}/CH_4$ under typical stimulated field gas stream and testing conditions up to 800 psi feed pressure, as compared to conventional PDMS membranes that do not contain such crosslinkers or as compared to modified siloxane rubbery membranes crosslinked without a rigid or large substituent group silanol-terminated PDMS crosslinker.

The crosslinked composite siloxane membrane materials of the present disclosure exhibit enhanced separation performance for $C_{3+}$ hydrocarbon removal from natural gas. The membranes are polydimethylsiloxane (PDMS)-based membranes that contain a silanol crosslinker functionalized with one or more rigid or large or bulky substituent groups. The membranes of the present disclosure can be prepared as thin film composites on microporous polyacrylonitrile (PAN) supports. Also provided in the present disclosure are methods of $C_{3+}$ hydrocarbon removal from natural gas using the membranes containing the functionalized silanol crosslinker.

Figure 2A:
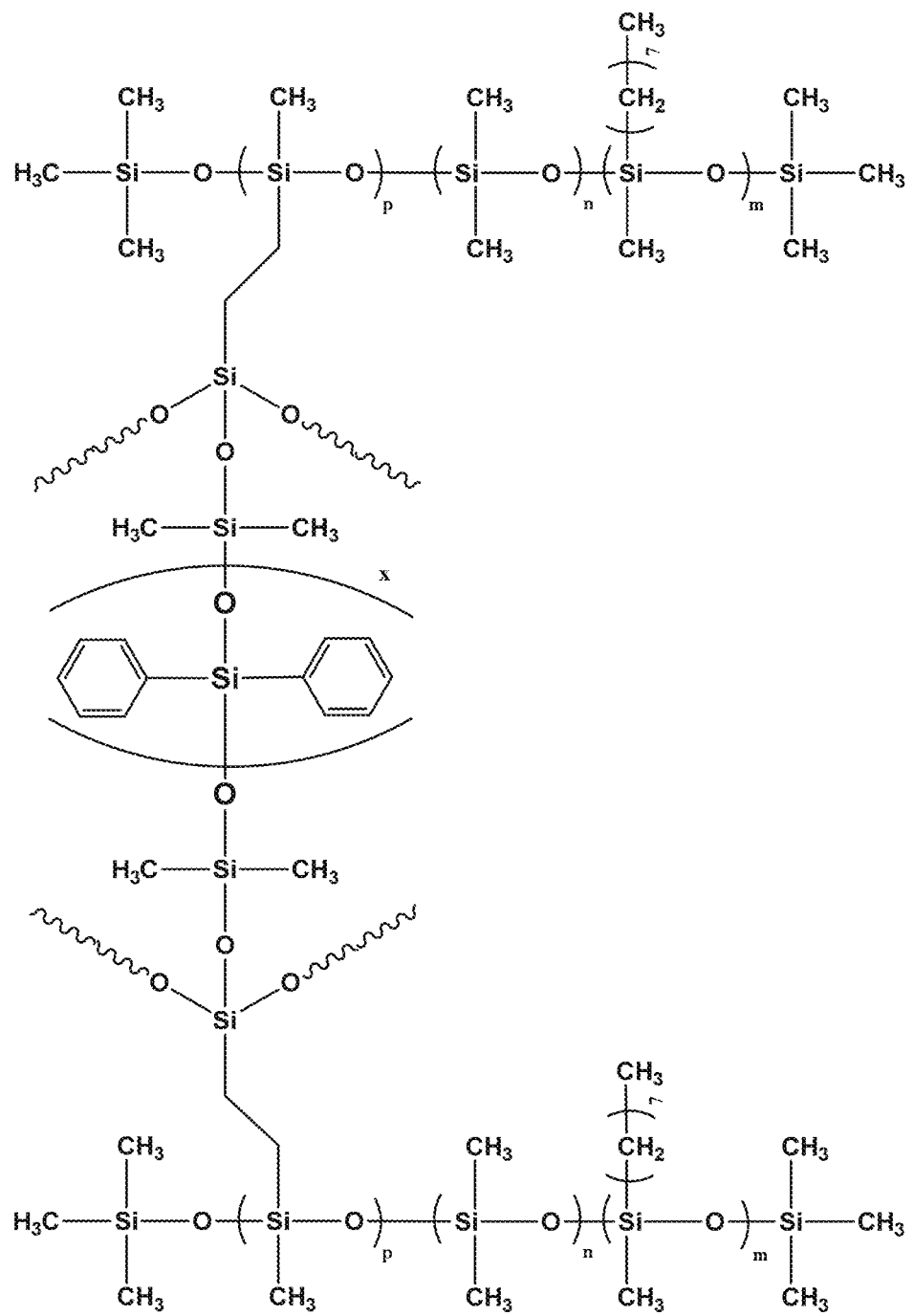
FIGS. 2A-2B show the products obtained from the process illustrated in FIG. 1.
Figure 2B:
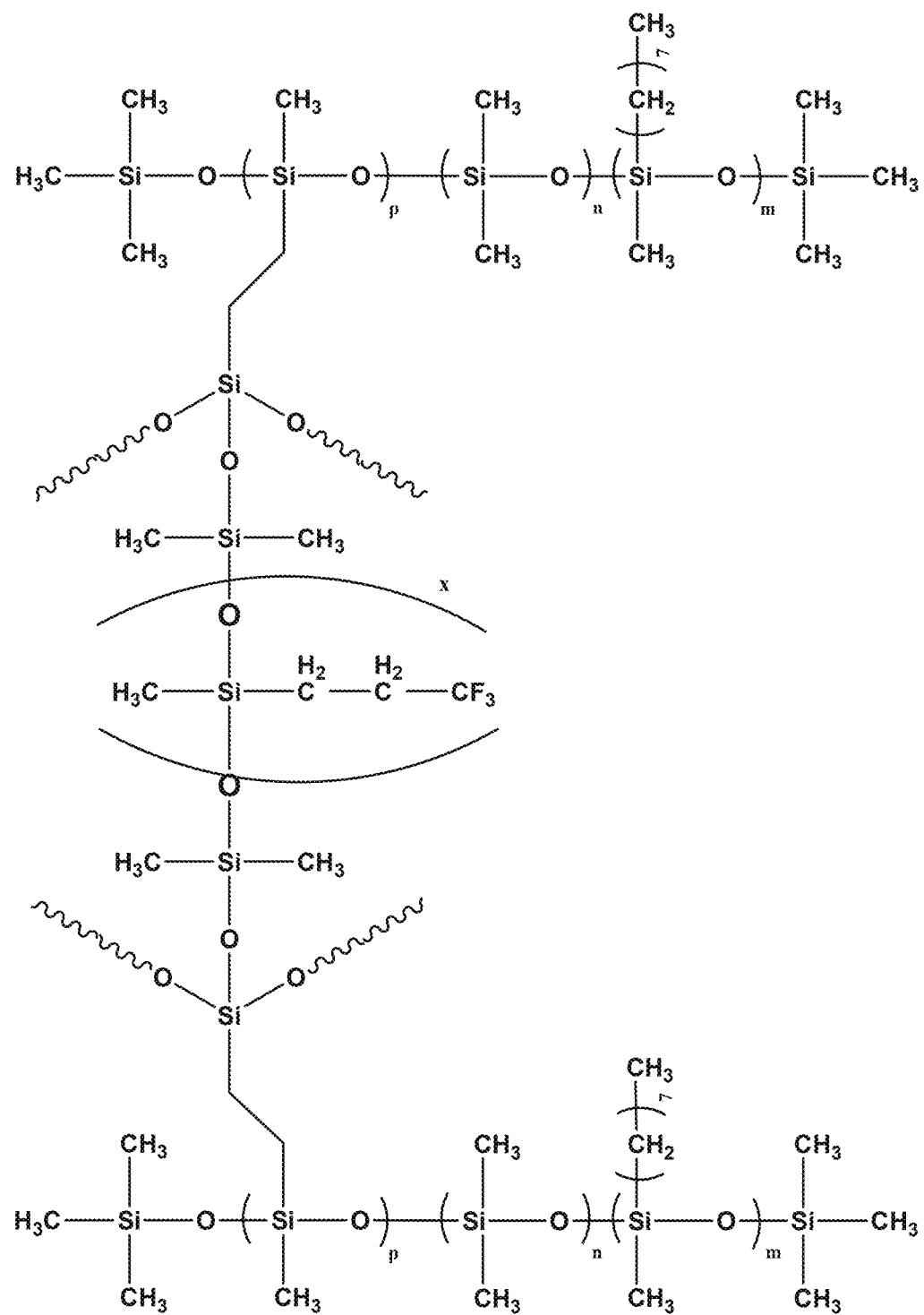
Figure 3:
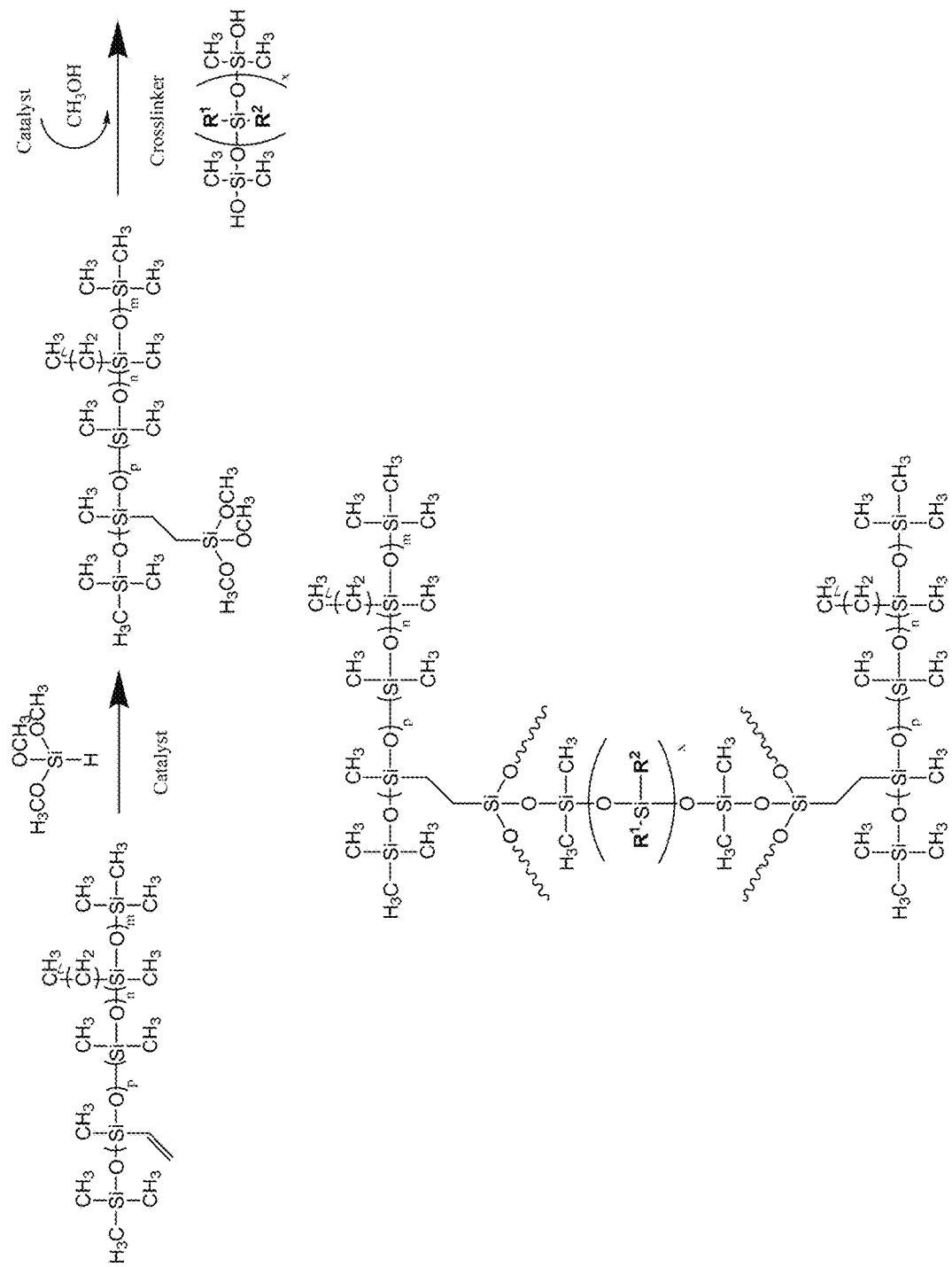
FIG. 3 is a schematic illustration of the synthesis of exemplary crosslinked siloxane membranes.

The polymer materials and the crosslinked siloxane composite membranes of the present disclosure can be prepared using various synthetic schemes, such as those described in the Examples and depicted in FIGS. 1-3.

In some embodiments, the synthesis involves forming a crosslinkable siloxane prepolymer such as shown in Scheme 1.

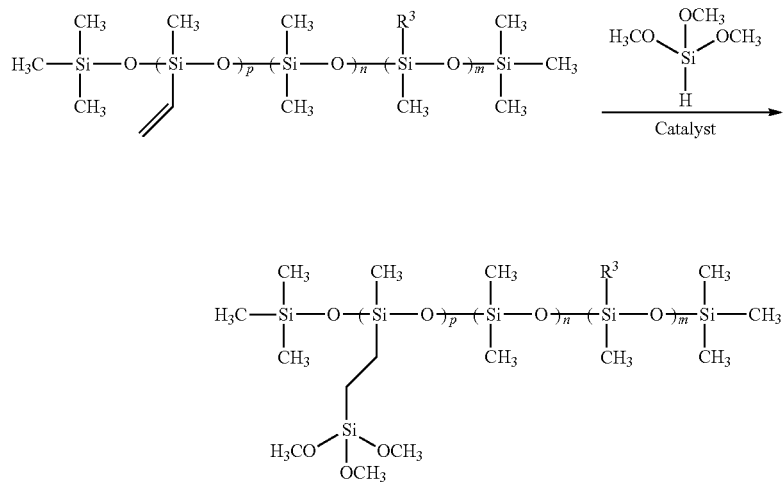

Scheme 1

In some embodiments, the siloxane prepolymer is a vinylmethylsiloxane terpolymer. In some embodiments, the siloxane prepolymer has a backbone having the general formula $(VinylMeSiO)_p(Me_2SiO)_n(R^3MeSiO)_m$, where $R^3$ is a straight-chain alkane having an alkyl chain length between 6 and 18 carbon atoms. In some embodiments, $R^3$ is a straight-chain alkane having an alkyl chain length between 6 and 18 carbon atoms, such as between 6 and 16 carbon atoms, between 6 and 14 carbon atoms, between 6 and 12 carbon atoms, between 6 and 10 carbon atoms, between 6 and 8 carbon atoms, between 8 and 18 carbon atoms, between 8 and 16 carbon atoms, between 8 and 14 carbon atoms, between 8 and 12 carbon atoms, between 8 and 12 carbon atoms, between 8 and 10 carbon atoms, or 6, 7, 8, 9, 10, 11, 12, 13, 14, 15, 16, 17, or 18 carbon atoms. In some embodiments, $R^3$ is octyl (8 carbon atoms). In some embodiments, $R^3$ is nonyl (9 carbon atoms). In some embodiments, $R^3$ is decyl (10 carbon atoms). In some embodiments, $R^3$ is hexadecyl (16 carbon atoms). In some embodiments, $R^3$ octadecyl (18 carbon atoms). In some embodiments, the siloxane prepolymer has a backbone having the general formula $(VinylMeSiO)_p(Me_2SiO)_n(OctylMeSiO)_m$. In some embodiments, m is an integer between about 0.3 and about 0.5, such as about 0.35 to about 0.45, about 0.3 to about 0.4, or about 0.35 to about 0.4. In some embodiments, p is an integer between about 0.02 and about 0.06, such as about 0.03 to about 0.05. In some embodiments, n is an integer represented by (1−m−p). In some embodiments, m is an integer between 0.35 and 0.4; p is an integer between 0.03 and 0.05; and n is (1−m−p). In some embodiments, the siloxane prepolymer is a 3-5% vinylmethylsiloxane −35-40% octylmethylsiloxane-dimethylsiloxane terpolymer with a molecular weight of about 10,000 Dalton to about 12,000 Dalton. In some embodiments, the siloxane prepolymer is dissolved in an organic solvent to form a homogeneous solution. In some embodiments, the organic solvent is selected from chloroform or hexanes. In some embodiments, trimethoxysilane is added to the homogenous solution containing the siloxane prepolymer. In some embodiments, about 0.1 wt % is to about 5 wt %, such as about 1 wt % to about 2 wt % of trimethoxysilane is added to the solution. In some embodiments, the solution is stirred, such as at room temperature, for a period of time. In some embodiments, the solution is stirred for about 30 minutes at room temperature. In some embodiments, the solution is stirred under nitrogen gas. In some embodiments, a catalyst is added to the solution. In some embodiments, the catalyst is a Pt catalyst. In some embodiments, the Pt catalyst is 1,3-diethenyl-1,1, 3,3-tetramethyldisiloxane platinum complex. In some embodiments, the resulting mixture is stirred for a period of time at an elevated temperature to form the crosslinkable siloxane prepolymer. The crosslinkable siloxane prepolymer can have a molecular weight of about 500 Dalton (Da) to about 500,000 Da, such as about 1,000 Da to about 400,000 Da, about 5,000 Da to about 300,000 Da, about 10,000 Da to about 200,000 Da, or about 50,000 Da to about 100,000 Da. In some embodiments, the crosslinkable siloxane prepolymer is a crosslinkable vinylmethylsiloxane terpolymer. In some embodiments, the mixture is stirred for about 2 hours at about 25° C., then for about 2 hours at about 40° C. In some embodiments, the mixture is stirred under nitrogen gas.

In some embodiments, the synthesis involves preparing a crosslinked siloxane membrane from the crosslinkable siloxane prepolymer prepared in Scheme 1 such as shown in Scheme 2.

Scheme 2

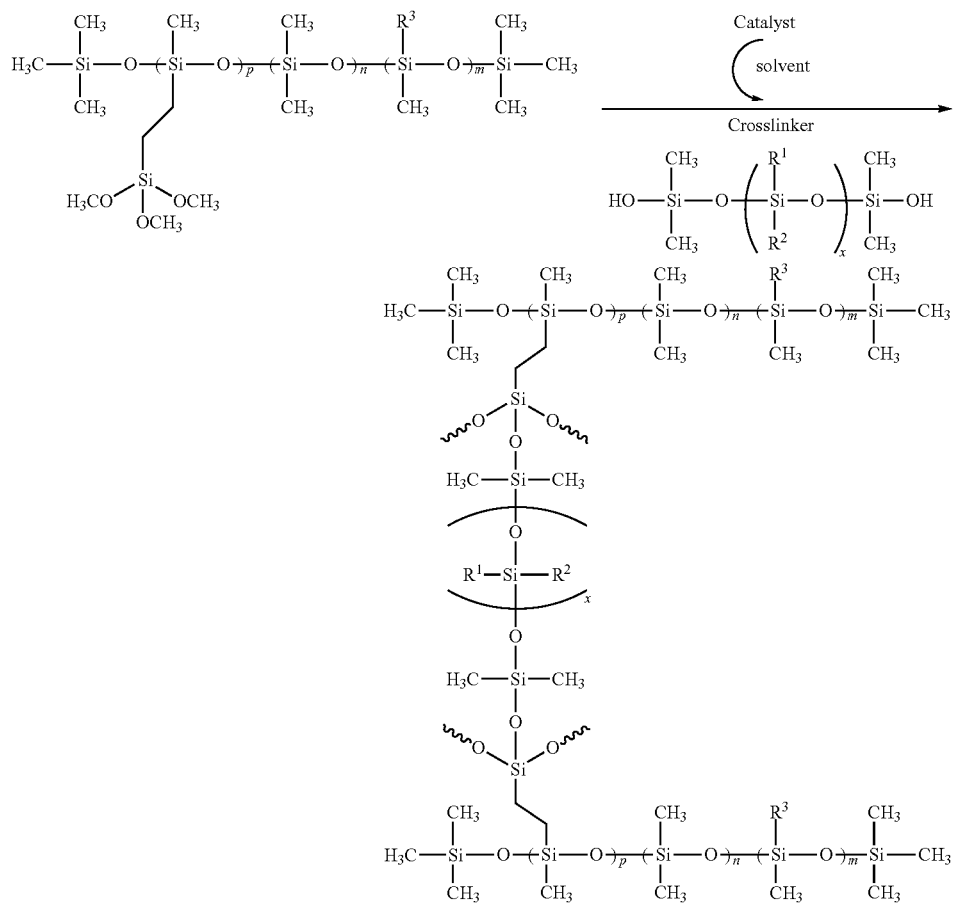

In some embodiments, the crosslinkable siloxane prepolymer is dissolved in an organic solvent to form a homogenous solution. In some embodiments, the organic solvent is selected from methanol, chloroform, and hexanes. A silanol-terminated crosslinker, such as a silanol-terminated crosslinker of the present disclosure that is functionalized with rigid or large or bulky substituents, is then added to the solution. In some embodiments, the silanol-terminated crosslinker is a functional silanol-terminated PDMS (OH-PDMS-OH) with rigid or bulky groups attached to the flexible siloxane (—(SiO)$_x$—) backbone chain (—(SiOR$^1$R$^2$)$_x$—), where x is an integer between about 0.02 and about 0.06, such as about 0.03 to about 0.05. In some embodiments, x is an integer between 0.03 and 0.05. For example, R$^1$ and R$^2$ as shown in Scheme 2 are rigid or bulky groups. In some embodiments, the rigid or bulky groups are selected from phenyl, $C_1$-$C_6$ alkyl, and $C_1$-$C_6$ haloalkyl, and combinations thereof. In some embodiments, the rigid or bulky groups are selected from phenyl, $C_1$-$C_3$ alkyl, and $C_1$-$C_3$ haloalkyl, and combinations thereof. In some embodiments, is the rigid or bulky groups are selected from phenyl, methyl, and trifluoropropyl, and combinations thereof. In some embodiments, R$^1$ is phenyl and R$^2$ is phenyl. In some embodiments, R$^1$ is $C_1$-$C_6$ alkyl and R$^2$ is $C_1$-$C_6$ haloalkyl. In some embodiments, R$^1$ is $C_1$-$C_3$ alkyl and R$^2$ is $C_1$-$C_3$ haloalkyl. In some embodiments, R$^1$ is methyl and R$^2$ is trifluoropropyl. A catalyst is also added to the solution. In some embodiments, the catalyst is a tin catalyst. In some embodiments, the catalyst is dibutyltin dilaurate (DBTDL). In some embodiments, the solution containing the crosslinkable siloxaneprepolymer, silanol-terminated crosslinker, and catalyst is stirred for a period of time at an elevated temperature to form a crosslinked siloxane membrane material. In some embodiments, the solution is stirred for about 5 minutes to about 60 minutes at about 25° C.

In some embodiments, the silanol-terminated crosslinker is a silanol-terminated polydiphenylsiloxane. In some embodiments, the silanol-terminated polydiphenylsiloxane has a molecular weight of about 1,000 Dalton to about 1,4000 Dalton and about 100 mol % diphenylsiloxane. In some embodiments, the silanol-terminated crosslinker is a silanol-terminated polydiphenylsiloxane having the structure:

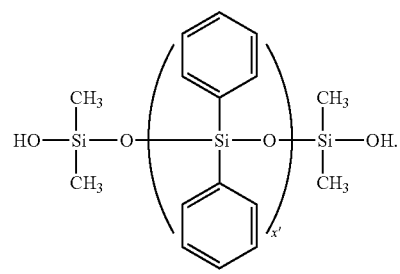

In some embodiments, the silanol-terminated crosslinker is a silanol-terminated polytrifluoropropylmethylsiloxane. In some embodiments, the silanol-terminated polytrifluoropropylmethylsiloxane has a molecular weight of about 550 Dalton to about 12,000 Dalton and about 100 mol % trifluoropropylmethylsiloxane. In some embodiments, the silanol-terminated crosslinker is a silanol-terminated polytrifluoropropylmethylsiloxane having the structure:

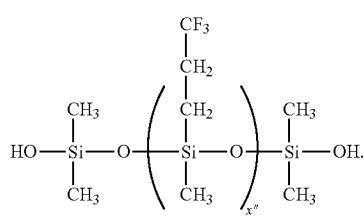

In some embodiments, the silanol-terminated crosslinker is added at about 5 wt % to about 30 wt % of the crosslinkable prepolymer, such as about 5 wt % to about 25 wt %, about 5 wt % to about 20 wt %, about 5 wt % to about 15 wt %, about 5 wt % to about 10 wt %, about 10 wt % to about 30 wt %, about 10 wt % to about 25 wt %, about 10 wt % to about 20 wt %, about 10 wt % to about 15 wt %, about 15 wt % to about 30 wt %, about 15 wt % to about 25 wt %, about 15 wt % to about 20 wt %, about 20 wt % to about 30 wt %, about 20 wt % to about 25 wt %, about 25 wt % to about 30 wt %, or about 5 wt %, about 10 wt %, about 15 wt %, about 20 wt %, about 25 wt %, or about 30 wt %.

In some embodiments, the catalyst is added at about 1 wt % to about 4 wt % of the crosslinker, such as about 1 wt % to about 3 wt %, about 1 wt % to about 2 wt %, about 2 wt % to about 4 wt %, about 2 wt % to about 3 wt %, about 3 wt % to about 4 wt %, or about 1 wt %, about 2 wt %, about 3 wt %, or about 4 wt %. In some embodiments, the catalyst is dibutyltin dilaurate (DBTDL).

The crosslinked siloxane composite membranes of the present disclosure can be prepared by casting a separation layer solution containing any of the polymer materials previously described, dissolved in an appropriate solvent such as chloroform or hexane, for example, onto a polymer support. Suitable polymer supports include microporous supports such as, for example, polyacrylonitrile, polyvinylidene fluoride, or polyether sulfone. In some embodiments, the crosslinked siloxane membrane material is prepared as a thin film composite on a microporous support through a hydrolysis-polycondensation process. In some embodiments, the crosslinked siloxane membrane material is cast onto a microporous support to form a crosslinked siloxane membrane. In some embodiments, the microporous support is selected from polyacrylonitrile (PAN) with a molecular weight cut-off (MWCO) of about 150K, polyvinylidene fluoride (PVDF) with a MWCO of about 75K to about 250K, and polyether sulfone (PES) with a MWCO of about 10K to about 20K at 20° C. The polymer materials as cast can be dried and further subjected to a mild heat treatment to fully crosslink the membrane on the polymer support. Thus, in some embodiments, the process involves drying the resulting crosslinked siloxane composite membrane to remove residual solvent and to fully crosslink the polymer. In some embodiments, the membrane is dried at room temperature for about 12 hours followed by drying at about 75° C. in an oven for about 3 days.

The resulting functionalized and crosslinked siloxane composite membranes can then be incorporated into a gas-separation system or used to separate heavy hydrocarbons from natural gas. Composite membranes including the polymer materials of the present disclosure exhibit enhanced permeance to heavy hydrocarbons and enhanced selectivity of heavy hydrocarbons over gases such as methane, carbon dioxide, oxygen, and nitrogen.

Thus, provided in the present disclosure are polymeric membranes for $C_{3+}$ hydrocarbon removal from natural gas. The polymeric membranes of the present disclosure are polydimethylsiloxane (PDMS)-based membranes that have been functionalized to increase the permeation properties of the membrane and improve membrane separation performance. In some embodiments, the membranes of the present disclosure contain a polymer material having a repeat unit of Formula (I):

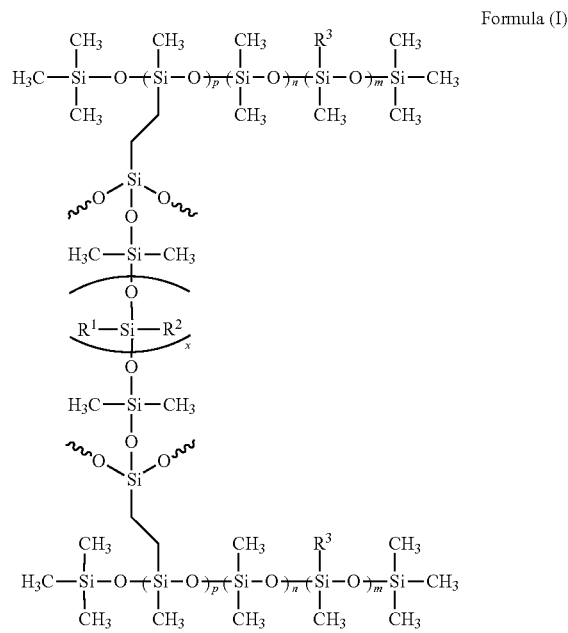

Formula (I)

where $R^1$ is selected from the group consisting of phenyl, —$(C_1$-$C_6$ alkyl), and —$(C_1$-$C_6$ haloalkyl); $R^2$ is selected from the group consisting of phenyl, —$(C_1$-$C_6$ alkyl), and —$(C_1$-$C_6$ haloalkyl); $R^3$ is selected from the group consisting of phenyl and -$(C_1$-$C_{18}$ alkyl); m is an integer between 0.35 and 0.4; p is an integer between 0.03 and 0.05; n is (1−m−p); and x is an integer between 0.03 and 0.05. In some embodiments, $R^1$ is selected from the group consisting of phenyl and —$CH_2CH_2CF_3$. In some embodiments, $R^2$ is selected from the group consisting of phenyl and methyl. In some embodiments, $R^1$ and $R^2$ are each phenyl. In some embodiments, $R^1$ is —$CH_2CH_2CF_3$ and $R^2$ is methyl. In some embodiments, $R^1$ is -phenyl and $R^2$ is methyl. In some embodiments, $R^1$ is —$(C_8$-$C_{10}$ alkyl). In some embodiments, $R^3$ is —$(C_8$ alkyl). In some embodiments, the membrane is cast on a PAN support.

Methods of Removing $C_{3+}$ Hydrocarbons From Natural Gas

Figure 4:
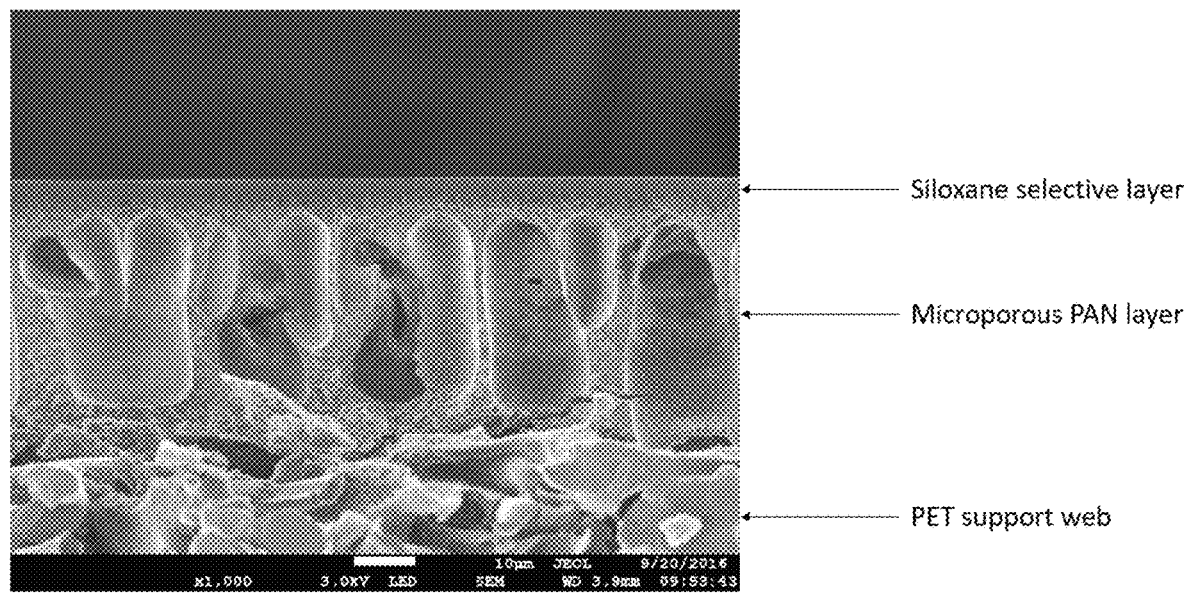
FIG. 4 shows the thin film structure of an exemplary siloxane composite membrane.

Polymeric membranes are thin semipermeable barriers that selectively separate some gas compounds from others. The membranes are dense films that do not operate as a filter, but rather separate gas compounds based on how well the different compounds dissolve into the membrane and diffuse through it (the solution-diffusion model). A simple membrane-processing scheme is shown in FIG. 4 for natural gas separation and upgrading, where a feed gas containing condensable gases (for example, propane ($C_3H_8$) and butane ($C_4H_{10}$)), and other non-condensable gases (for example, methane ($CH_4$) and nitrogen ($N_2$)) can be separated into a permeate stream rich in $C_{3+}$ heavy hydrocarbons ($C_3H_8$ and $C_4H_{10}$ enriched) and a $CH_4$-rich residual stream. Rubbery siloxane membranes, such as polydimethylsiloxane (PDMS), find industrial application for $C_{3+}$ heavy hydrocarbons recovery from natural gas; however, conventional PDMS membranes with a flexible $(Me_2SiO)_x$ backbone can exhibit lower selectivities of $C_{3+}$ hydrocarbons to methane (for example, $C_3H_8/CH_4$ and $C_4H_{10}/CH_4$ selectivities) due to higher degree of swelling under aggressive feed streams and operating conditions. The crosslinked siloxane composite membranes of the present disclosure achieve enhanced $C_{3+}$ hydrocarbon recovery from natural gas while reducing capital and operating expenditures. In some embodiments, the crosslinked siloxane composite membranes exhibit enhanced separation performance under simulated field gas composition conditions (such as feed pressure of up to 800 psi for a multicomponent gas mixture consisting $C_1$-$C_5$ hydrocarbons, $CO_2$, $N_2$, and representative aromatic hydrocarbons).

In some embodiments, the crosslinked siloxane composite hybrid membranes of the present disclosure demonstrate increased crosslinking density compared to conventional crosslinked PDMS membranes and crosslinked siloxane membranes without the rigid or bulky groups. In some embodiments, the crosslinked siloxane composite hybrid membranes of the present disclosure have a crosslinking density (v) of about $2 \times 10^{-5}$ mol/mL or greater, such as about $5 \times 10^{-5}$ mol/mL to about $50 \times 10^{-5}$ mol/mL, about $10 \times 10^{-5}$ mol/mL to about $40 \times 10^{-5}$ mol/mL, about $15 \times 10^{-5}$ mol/mL to about $35 \times 10^{-5}$ mol/mL, about $20 \times 10^{-5}$ mol/mL to about $30 \times 10^{-5}$ mol/mL, or about $5 \times 10^{-5}$ mol/mL, about $10 \times 10^{-5}$ mol/mL, about $11 \times 10^{-5}$ mol/mL, about $15 \times 10^{-5}$ mol/mL, about $20 \times 10^{-5}$ mol/mL, about $25 \times 10^{-5}$ mol/mL, about $30 \times 10^{-5}$ mol/mL, about $35 \times 10^{-5}$ mol/mL, about $40 \times 10^{-5}$ mol/mL, about $45 \times 10^{-5}$ mol/mL, or about $50 \times 10^{-5}$ mol/mL. In some embodiments, the crosslinked siloxane composite membranes of the present disclosure have a crosslinking density (v) of about $5 \times 10^{-5}$ mol/mL to about $15 \times 10^{-5}$ mol/mL. In some embodiments, the crosslinked siloxane composite membranes of the present disclosure have a crosslinking density (v) of about $5 \times 10^{-5}$ mol/mL to about $10 \times 10^{-5}$ mol/mL. In some embodiments, the crosslinked siloxane composite membranes of the present disclosure have a crosslinking density (v) of about $9 \times 10^{-5}$ mol/mL.

In some embodiments, the crosslinked siloxane composite membranes of the present disclosure demonstrate enhanced swelling resistance (lower swelling degree (Q)) compared to conventional crosslinked PDMS membranes and crosslinked siloxane membranes without the rigid or bulky groups. In some embodiments, the crosslinked siloxane composite membranes of the present disclosure have a swelling degree (Q) of about 2.00 or lower, such as about 0.10 to about 2.00, about 0.10 to about 1.99, about 0.25 to about 1.75, about 0.50 to about 1.50, about 0.75 to about 1.25, about 1.00 to about 1.50, about 1.25 to about 1.75, or about 0.10, about 0.25, about 0.50, about 0.75, about 1.00, about 1.25, about 1.50, about 1.65, about 1.75, about 1.80, or about 2.00. In some embodiments, the crosslinked siloxane composite membranes of the present disclosure have a swelling degree (Q) of about 1.5 to about 2.00. In some embodiments, the crosslinked siloxane composite membranes of the present disclosure have a swelling degree (Q) of about 1.55 to about 1.75. In some embodiments, the crosslinked siloxane composite membranes of the present disclosure have a swelling degree (Q) of about 1.65.

In some embodiments, the crosslinked siloxane composite membranes of the present disclosure show increased single gas selectivities for $C_{3+}/CH_4$ compared to conventional crosslinked PDMS membranes and crosslinked siloxane membranes without the rigid or bulky groups under the same testing conditions, such as feed temperature of 20° C. and feed pressure of 1 bar. In some embodiments, the crosslinked siloxane composite membranes of the present disclosure exhibit increased $C_3H_8/CH_4$ single gas selectivities as compared to conventional crosslinked PDMS membranes and crosslinked siloxane membranes without the rigid or bulky groups under the same testing conditions. In some embodiments, the crosslinked siloxane composite membranes of the present disclosure have $C_3H_8/CH_4$ single gas selectivities ($\alpha_{C3H8/CH4}$) of about 5 or more, such as about 7 to about 100, about 10 to about 90, about 20 to about 80, about 30 to about 70, about 40 to about 60, about 45 to about 55, about 5 to about 10, about 10 to about 15, or about 7, about 7.5, about 10, about 12, about 13, about 15, about 20, about 25, about 30, about 35, about 40, about 45, about 50, about 55, about 60, about 65, about 70, about 75, about 80, about 85, about 90, about 95, or about 100 when tested at feed temperature of 20° C. and feed pressure of 1 bar. In some embodiments, the crosslinked siloxane composite membranes of the present disclosure have $C_3H_8/CH_4$ single gas selectivities ($\alpha C_3H_8/CH_4$) of about 7 to about 10 when tested at feed temperature of 20° C. and feed pressure of 1 bar. In some embodiments, the crosslinked siloxane composite membranes of the present disclosure have $C_3H_8/CH_4$ single gas selectivities ($\alpha C_3H_8/CH_4$) of about 7 to about 8 when tested at feed temperature of 20° C. and feed pressure of 1 bar. In some embodiments, the crosslinked siloxane composite membranes of the present disclosure have $C_3H_8/CH_4$ single gas selectivities ($\alpha C_3H_8/CH_4$) of about 7.5 when tested at feed temperature of 20° C. and feed pressure of 1 bar.

In some embodiments, the crosslinked siloxane composite membranes of the present disclosure exhibit increased $C_4H_{10}/CH_4$ single gas selectivities as compared to conventional crosslinked PDMS membranes and crosslinked siloxane membranes without the rigid or bulky groups under the same testing conditions. In some embodiments, the crosslinked siloxane composite membranes of the present disclosure have $C_4H_{10}/CH_4$ single gas selectivities ($\alpha C_4H_{10}/CH_4$) of about 20 or more, such as about 20 to about 100, about 20 to about 90, about 30 to about 80, about 30 to about 75, about 40 to about 60, about 45 to about 55, about 30 to about 40, about 65 to about 75, or about 20, about 25, about 30, about 34.5, about 35, about 40, about 45, about 50, about 55, about 60, about 65, about 70, about 72, about 75, about 80, about 85, about 90, about 95, or about 100 when tested at feed temperature of 20° C. and feed pressure of 1 bar. In some embodiments, the crosslinked siloxane composite membranes of the present disclosure have $C_4H_{10}/CH_4$ single gas selectivities ($\alpha C_4H_{10}/CH_4$) of about 30 to about 50 when tested at feed temperature of 20° C. and feed pressure of 1 bar. In some embodiments, the crosslinked siloxane composite membranes of the present disclosure have $C_4H_{10}/CH_4$ single gas selectivities ($\alpha C_4H_{10}/CH_4$) of about 40 to about 50 when tested at feed temperature of 20° C. and feed pressure of 1 bar. In some embodiments, the crosslinked siloxane composite membranes of the present disclosure have $C_4H_{10}/CH_4$ single gas selectivities ($\alpha C_4H_{10}/CH_4$) of about 44 when tested at feed temperature of 20° C. and feed pressure of 1 bar.

In some embodiments, the crosslinked siloxane composite membranes of the present disclosure show increased mixed gas selectivities for $C_{3+}/CH_4$ compared to conventional crosslinked PDMS membranes and crosslinked siloxane membranes without the rigid or bulky groups under the same multi-component gas mixture testing conditions, such as at feed temperature of 20° C. and feed pressure of 800 psi (55 bar). In some embodiments, the multi-component gas mixture is a 6-component gas mixture. In some embodiments, the multi-component gas mixture is a 6-component gas mixture containing $CO_2$, $N_2$, $C_2H_6$, $C_3H_8$, $C_4H_{10}$, and $CH_4$. In some embodiments, the multi-component gas mixture is a 6-component gas mixture containing about 12% $CO_2$, about 12% $N_2$, about 5% $C_2H_6$, about 3% $C_3H_8$, about 1.5% $C_4H_{10}$, and about 66.5% $CH_4$. In some embodiments, the crosslinked siloxane composite membranes of the present disclosure exhibit increased $C_3H_8/CH_4$ mixed gas selectivities as compared to conventional crosslinked PDMS membranes and crosslinked siloxane membranes without the rigid or bulky groups under the same testing conditions in a 6-component gas mixture. In some embodiments, the crosslinked siloxane composite membranes of the present disclosure have $C_3H_8/CH_4$ mixed gas selectivities ($\alpha C_3H_8/CH_4$) of about 5 or more, such as about 7 to about 100, about 10 to about 90, about 20 to about 80, about 30 to about 70, about 40 to about 60, about 45 to about 55, about 5 to about 10, about 10 to about 15, or about 7, about 7.5, about 10, about 12, about 13, about 15, about 20, about 25, about 30, about 35, about 40, about 45, about 50, about 55, about 60, about 65, about 70, about 75, about 80, about 85, about 90, about 95, or about 100 when tested at feed temperature of 20° C. and feed pressure of 800 psi in a 6-component gas mixture. In some embodiments, the crosslinked siloxane composite membranes of the present disclosure have $C_3H_8/CH_4$ mixed gas selectivities ($\alpha C_3H_8/CH_4$) of about 7 to about 10 when tested at feed temperature of 20° C. and feed pressure of 800 psi in a 6-component gas mixture. In some embodiments, the crosslinked siloxane composite membranes of the present disclosure have $C_3H_8/CH_4$ mixed gas selectivities ($\alpha C_3H_8/CH_4$) of about 7 to about 8 when tested at feed temperature of 20° C. and feed pressure of 800 psi in a 6-component gas mixture.

In some embodiments, the crosslinked siloxane composite membranes of the present disclosure exhibit increased $C_4H_{10}/CH_4$ mixed gas selectivities as compared to conventional crosslinked PDMS membranes and crosslinked siloxane membranes without the rigid or bulky groups under the same testing conditions in a 6-component gas mixture. In some embodiments, the crosslinked siloxane composite membranes of the present disclosure have $C_4H_{10}/CH_4$ mixed gas selectivities ($\alpha C_4H_{10}/CH_4$) of about 10 or more, such as about 15 to about 100, about 20 to about 90, about 30 to about 80, about 40 to about 70, about 50 to about 60, about 45 to about 55, about 15 to about 20, or about 10, about 15, about 16, about 17, about 20, about 25, about 30, about 35, about 40, about 45, about 50, about 55, about 60, about 65, about 70, about 75, about 80, about 85, about 90, about 95, or about 100 when tested at feed temperature of 20° C. and feed pressure of 800 psi in a 6-component gas mixture. In some embodiments, the crosslinked siloxane composite membranes of the present disclosure have $C_4H_{10}/CH_4$ mixed gas selectivities ($\alpha C_4H_{10}/CH_4$) of about is 15 to about 25 when tested at feed temperature of 20° C. and feed pressure of 800 psi in a 6-component gas mixture. In some embodiments, the crosslinked siloxane composite membranes of the present disclosure have $C_4H_{10}/CH_4$ mixed gas selectivities ($\alpha C_4H_{10}/CH_4$) of about 16 when tested at feed temperature of 20° C. and feed pressure of 800 psi in a 6-component gas mixture. In some embodiments, the crosslinked siloxane composite membranes of the present disclosure have $C_4H_{10}/CH_4$ mixed gas selectivities ($\alpha C_4H_{10}/CH_4$) of about 20 when tested at feed temperature of 20° C. and feed pressure of 800 psi in a 6-component gas mixture.

In some embodiments, the crosslinked siloxane composite membranes of the present disclosure show increased mixed gas selectivities for $C_{3+}/CH_4$ compared to conventional crosslinked PDMS membranes and crosslinked siloxane membranes without the rigid or bulky groups under conditions that resemble a natural gas well, for example, a multi-component gas mixture at feed pressure of 800 psi. In some embodiments, the multi-component gas mixture is a 7-component gas mixture. In some embodiments, the multi-component gas mixture is a 7-component gas mixture containing $N_2$, $CH_4$, $C_2H_6$, $C_3H_8$, $C_4H_{10}$, $C_5H_{12}$, and toluene. In some embodiments, the multi-component gas mixture is a 7-component gas mixture containing about 14% $N_2$, about 78% $CH_4$, about 5% $C_2H_6$, about 2% $C_3H_8$, about 0.5% $C_4H_{10}$, about 0.5% $C_5H_{12}$, and about 500 ppm toluene. In some embodiments, the crosslinked siloxane composite membranes of the present disclosure exhibit increased $C_3H_8/CH_4$ mixed gas selectivities as compared to conventional crosslinked PDMS membranes and crosslinked siloxane membranes under the same testing conditions in a 7-component gas mixture. In some embodiments, the crosslinked siloxane composite membranes of the present disclosure have $C_3H_8/CH_4$ mixed gas selectivities ($\alpha C_3H_8/CH_4$) of about 5 or more, such as about 6 to about 100, about 10 to about 90, about 20 to about 80, about 30 to about 70, about 40 to about 60, about 45 to about 55, about 5 to about 10, about 10 to about 15, or about 6, about 7, about 7.5, about 10, about 12, about 13, about 15, about 20, about 25, about 30, about 35, about 40, about 45, about 50, about 55, about 60, about 65, about 70, about 75, about 80, about 85, about 90, about 95, or about 100 when tested at feed temperature of 20° C. and feed pressure of 800 psi in a 7-component gas mixture. In some embodiments, the crosslinked siloxane composite membranes of the present disclosure have $C_3H_8/CH_4$ mixed gas selectivities ($\alpha C_3H_8/CH_4$) of about 6 to about 10 when tested at feed temperature of 20° C. and feed pressure of 800 psi in a 7-component gas mixture. In some embodiments, the crosslinked siloxane composite membranes of the present disclosure have $C_3H_8/CH_4$ mixed gas selectivities ($\alpha C_3H_8/CH_4$) of about 7 when tested at feed temperature of 20° C. and feed pressure of 800 psi in a 7-component gas mixture.

In some embodiments, the crosslinked siloxane composite membranes of the present disclosure exhibit increased $C_4H_{10}/CH_4$ mixed gas selectivities as compared to conventional crosslinked PDMS membranes and crosslinked siloxane membranes without the rigid and bulky groups under the same testing conditions in a 7-component gas mixture. In some embodiments, the crosslinked siloxane composite membranes of the present disclosure have $C_4H_{10}/CH_4$ mixed gas selectivities ($\alpha C_4H_{10}/CH_4$) of about 5 or more, such as about 10 to about 100, about 15 to about 90, about 20 to about 80, about 30 to about 70, about 40 to about 60, about 45 to about 55, about 10 to about 15, about 15 to about 20, or about 10, about 11, about 15, about 18, about 19, about 20, about 25, about 30, about 35, about 40, about 45, about 50, about 55, about 60, about 65, about 70, about 75, about 80, about 85, about 90, about 95, or about 100 when tested at feed temperature of 20° C. and feed pressure of 800 psi in a 7-component gas mixture. In some embodiments, the crosslinked siloxane composite membranes of the present disclosure have $C_4H_{10}/CH_4$ mixed gas selectivities ($\alpha C_4H_{10}/CH_4$) of about 12 to about 20 when tested at feed temperature of 20° C. and feed pressure of 800 psi in a 7-component gas mixture. In some embodiments, the crosslinked siloxane composite membranes of the present disclosure have $C_4H_{10}/CH_4$ mixed gas selectivities ($\alpha C_4H_{10}/CH_4$) of about 14 to about 18 when tested at feed temperature of 20° C. and feed pressure of 800 psi in a 7-component gas mixture. In some embodiments, the crosslinked siloxane composite membranes of the present disclosure have $C_4H_{10}/CH_4$ mixed gas selectivities ($\alpha C_4H_{10}/CH_4$) of about 14 when tested at feed temperature of 20° C. and feed pressure of 800 psi in a 7-component gas mixture. In some embodiments, the crosslinked siloxane composite membranes of the present disclosure have $C_4H_{10}/CH_4$ mixed gas selectivities ($\alpha C_4H_{10}/CH_4$) of about 16.75 when tested at feed temperature of 20° C. and feed pressure of 800 psi in a 7-component gas mixture.

Thus, provided are methods of separating $C_{3+}$ hydrocarbons from natural gas. The methods involve providing a crosslinked siloxane composite membrane, such as a membrane of the present disclosure, introducing a natural gas stream to the membrane, and separating the $C_{3+}$ hydrocarbons from the natural gas. In some embodiments, the $C^{3+}$ hydrocarbons are more permeable through the membrane than methane. In some embodiments, after removal, the $C_{3+}$ hydrocarbons are recovered and reused. For example, the recovered $C_{3+}$ hydrocarbons can be used as chemical feedstock, as a liquid fuel for power generation, or for seawater desalination, among other uses. In some embodiments, the $C_{3+}$ hydrocarbons separated from the natural gas is propane ($C_3H_8$). In some embodiments, the $C_{3+}$ hydrocarbons separated from the natural gas is butane ($C_4H_{10}$). In some embodiment, the $C_{3+}$ hydrocarbons separated from the natural gas are propane ($C_3H_8$) and butane ($C_4H_{10}$).

In some embodiments of the methods, the crosslinked siloxane composite membrane is a membrane of the present disclosure that contains a silanol-terminated siloxane crosslinker having rigid or bulky substituent groups on the siloxane backbone. In some embodiments, the crosslinked siloxane membrane contains a compound of Formula (I). In some embodiments, the membrane is prepared as a thin film composite on a microporous polyacrylonitrile (PAN) support.

Unless otherwise defined, all technical and scientific terms used in this document have the same meaning as commonly understood by one of ordinary skill in the art to which the present application belongs. Methods and materials are described in this document for use in the present application; other, suitable methods and materials known in the art can also be used. The materials, methods, and examples are illustrative only and not intended to be limiting. All publications, patent applications, patents, sequences, database entries, and other references mentioned in this document are incorporated by reference in their entirety. In case of conflict, the present specification, including definitions, will control.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (for example, 1%, 2%, 3%, and 4%) and the sub-ranges (for example, 0.1% to 0.5%, 1.1% to 2.2%, and 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

The term "about," as used in this disclosure, can allow for a degree of variability in a value or range, for example, within 10%, within 5%, or within 1% of a stated value or of a stated limit of a range.

As used in this disclosure, the terms "a," "an," and "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

In the methods described in this disclosure, the acts can be carried out in any order, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

EXAMPLES

Example 1—Preparation of Composite Membrane 1 (Ter-PDMS-2P)

A composite membrane on a microporous polyacrylonitrile (PAN) support containing the crosslinked siloxane rubbery membrane material shown in FIG. 2A was prepared. Composite Membrane 1 (Ter-PDMS-2P) was prepared by first synthesizing a crosslinkable siloxane prepolymer (Formula IV) and then blending with silanol-terminated polydiphenylsiloxane and a catalyst to form a separation solution which was then cast onto a PAN support.

Step 1: To modify the prepolymer, 10.0 g of a siloxane prepolymer with a $(VinylMeSiO)_p(Me_2SiO)_n(OctylMeSiO)_n$ backbone that included 3-5% vinylmethylsiloxane—35-40% octylmethylsiloxane-dimethylsiloxane terpolymer with a molecular weight of 10,000 to 12,000 Dalton, was added into a 100 mL three-neck flask. 2.0 g of trimethoxysilane (liquid) was then added, and the solution was stirred at room temperature with a mechanical stirrer for 30 min under nitrogen gas. About 0.4 wt % to about 1.5 wt % (such as about 1 wt %) Pt complex catalyst (1,3-diethenyl-1,1,3,3-tetramethyldisiloxane platinum complex) was added slowly into the prepolymer/silane mixture and stirred with a mechanical stirrer for 2 h at 25° C. and at 40° C. under nitrogen gas, respectively. The obtained light-yellow solution was used immediately for the preparation of the separation layer (Step 2) or stored in the refrigerator for future use. Scheme 3 depicts the synthesis of Step 1.

Scheme 3

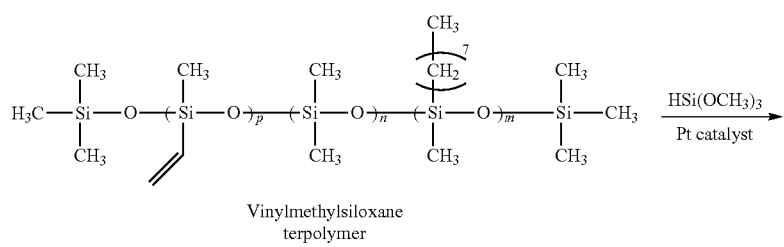

Vinylmethylsiloxane
terpolymer

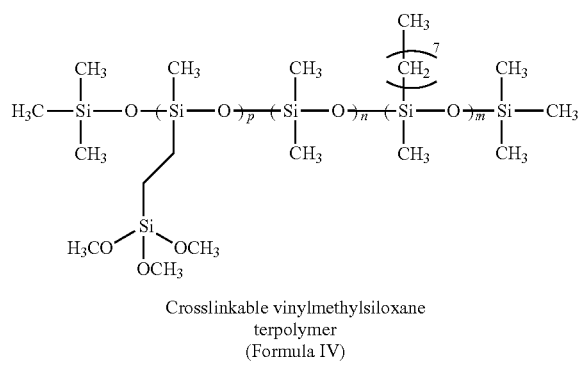

Crosslinkable vinylmethylsiloxane
terpolymer
(Formula IV)

Step 2: A separation solution was then prepared by dissolving 5.0 g of the modified prepolymer (Formula IV) in an organic solvent (chloroform or hexane) under vigorous mechanical stirring to form a homogeneous solution. Then an appropriate amount (5-30 wt % of the modified prepolymer) of the crosslinker, a silanol-terminated polydiphenylsiloxane (Formula V(A)), was added into the modified prepolymer solution to dissolve completely under mechanical stirring for 30 to 60 min at 25° C. The crosslinker had a molecular weight of 1,000-1,400 with 100 mol % of diphenylsiloxane and 2.4-3.4% of hydroxyl groups (OH) and the structure shown below.

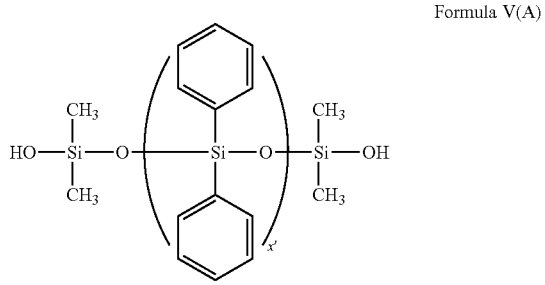

Formula V(A)

The catalyst dibutyltin dilaurate (DBTDL) (1-4 wt % of the crosslinker) was then added slowly into the solution, followed by stirring for 5 to 30 min at 25° C. The separation layer solution containing the dissolved modified prepolymer, the dissolved crosslinker, and the catalyst was then degassed and prepared for coating.

Step 3: The separation layer solution was cast via a doctor blade (10-20 mils blade depth) onto microporous polyacrylonitrile (PAN) support. The thin film composite membranes were dried slowly with a cover at 20° C. for 12 hours. They were then placed in an oven at 75° C. for 3 days to remove residual solvent and to fully crosslink the polymer, which resulted in Composite Membrane 1, having the structure shown in FIG. 2A. FIG. 4 illustrates the thin film structure of the resulting membrane.

Example 2—Preparation of Composite Membrane 2
(Ter-PDMS-3F)

A composite membrane on a microporous PAN support containing the crosslinked siloxane rubbery membrane material shown in FIG. 2B was prepared. Composite Membrane 2 (Ter-PDMS-3F) was prepared by first synthesizing a crosslinkable siloxane prepolymer (Formula IV) and then blending with silanol-terminated polytrifluoropropylmethylsiloxane and catalyst to form a separation solution which was then cast onto a PAN support.

Step 1 was performed as described in Example 1 and depicted in Scheme 1.

Step 2: A separation solution was then prepared by dissolving 5.0 g modified prepolymer (Formula IV) in an organic solvent (chloroform or hexane) under vigorous mechanical stirring to form a homogeneous solution. Then an appropriate amount (5-30 wt % of the modified prepolymer) of the crosslinker, a silanol-terminated polytrifluoropropylmethylsiloxane (Formula V(B)), was added into the modified prepolymer solution to dissolve completely under mechanical stirring for 30 to 60 min at 25° C. The crosslinker had a molecular weight of 550-1,200 with 100 mol % of trifluoropropylmethylsiloxane and 3.0-7.0% of hydroxyl groups (OH) and the structure shown below.

Formula V(B)

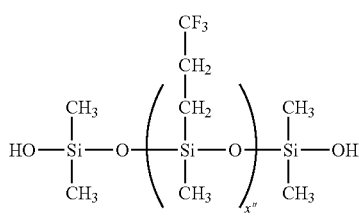

The catalyst dibutyltin dilaurate (DBTDL) (1-4 wt % of the crosslinker) was then added slowly into the solution, followed by stirring for 5 to 30 min at 25° C. The separation layer solution containing the dissolved modified prepolymer, the dissolved crosslinker, and the catalyst was then degassed and prepared for coating.

Step 3: The separation layer solution was cast via a doctor blade (10-20 mils blade depth) onto microporous polyacrylonitrile (PAN) support. The thin film composite membranes were dried slowly with a cover at 20° C. for 12 hours. They were then placed in an oven at 75° C. for 3 days to remove residual solvent and to fully crosslink the polymer, which resulted in Composite Membrane 2, having the structure shown in FIG. 2B. FIG. 4 illustrates the thin film structure of the resulting membrane.

Example 3—Preparation of Comparative Crosslinked Siloxane Composite Membrane (Ter-PDMS)

A comparative membrane, a crosslinked siloxane composite membrane (Ter-PDMS), was prepared. The comparative membrane was crosslinked without a silanol-terminated PDMS crosslinker containing rigid or bulky substituents, and was prepared according to the procedure described in Example 6 of U.S. Pat. No. 10,293,301. The comparative membrane was prepared from a separation solution that contained a crosslinkable siloxane prepolymer (Formula II), a silanol-terminated polydiphenylsiloxane (Formula III), and a catalyst. The structures of Formula II and Formula III are shown below.

Formula II

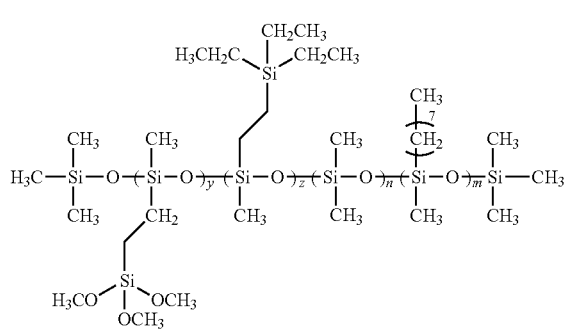

Formula III $$HO-Si(CH_3)_2-O-(Si(CH_3)_2-O)_n-Si(CH_3)_2-OH$$

Example 4—Preparation of Comparative Conventional PDMS Membrane (PDMS)

A comparative conventional PDMS composite membrane having a flexible —(Me$_2$SiO)$_n$— backbone chain was prepared using polymers from commercial sources. RTV 615 silicone rubber compound, which included the vinyl-terminated siloxane rubber precursor RTV 615A and the polymethylhydrosiloxane crosslinking agent RTV 615B were purchased from Momentive. The conventional PDMS composite membrane was prepared from a chloroform solution containing 10 wt % RTV 615 silicon rubber compounds (10 g RTV 615A and 1 g RTV 615B) and 0.03 g Pt(dvs) catalyst. The polymer solution was cast via doctor blade (10-20 mils blade depth) onto microporous PAN support. The thin film composite membranes were dried slowly with a cover at 20° C. for 12 hours. They were then placed in an oven at 75° C. for 3 days to remove residual solvent and to fully crosslink the polymer.

Example 5—Preparation of Comparative Crosslinked Siloxane Composite Membrane (POMS)

A comparative crosslinked siloxane composite membrane having a (VinylMeSiO)$_p$(Me$_2$SiO)$_n$(OctylMeSiO)$_n$ backbone chain was fabricated from a vinylmethylsiloxane terpolymer (Formula I) having the structure shown below.

Formula I $$H_3C-Si(CH_3)(CH_2)-O-(Si(CH=CH_2)(CH_3)-O)_p-(Si(CH_3)_2-O)_n-(Si(CH_3)(C_8H_{17})-O)_m-Si(CH_3)_3$$

5.0 g of a vinylmethylsiloxane terpolymer (3-5% vinylmethylsiloxane—35-45% octylmethylsiloxane-dimethylsiloxane having a molecular weight of 10,000 Dalton to 12,000 Dalton) was dissolved completely in chloroform at 20° C., then 0.5 g RTV 615B crosslinking agent and 0.06 g Pt(dvs) were added into the solution and stirred at 25° C. for 5-60 min. The polymer solution was then cast via doctor blade (10-20 mils blade depth) onto microporous PAN support. The thin film composite membranes were dried slowly with a cover at 20° C. for 12 hours. The membranes were then placed in an oven at 75° C. for 3 days to remove residual solvent and to fully crosslink the polymer.

Example 6—Membrane Physical Properties

The density of the conventional PDMS, crosslinked siloxane, and crosslinked siloxane organic-inorganic hybrid membranes at 25° C. was measured using helium Pycnometer (AccuPyc II 1340) from Micrometrics. The equilibrium degree of swelling was calculated in triplicate using conventional gravimetric method by immersing square-shaped specimens (0.2~0.4 g) in toluene until equilibrium swelling was reached. The swollen samples were pat dried and weighed immediately. The swelling degree (q) of the membrane was calculated using Equation (1).

$$q = \frac{W_{wet} - W_0}{W_0} \quad (1)$$

where $W_{wet}$ is the wet weight of the dense films after swelling and $W_0$ is the dry weight of the dense films before swelling. The crosslinking density, v, of the dense films was calculated according to the Flory-Rehner equation using data obtained from specimen toluene swelling.

The density, swelling degree, and crosslinking density of the conventional membranes (PDMS and POMS), the comparative crosslinked membrane (Ter-PDMS), and the crosslinked siloxane Composite Membrane 1 (Ter-PDMS-2P) and Composite Membrane 2 (Ter-PDMS-3F) are shown in Table 1. The results show that Composite Membrane 1 exhibited higher swelling resistance and crosslinking density as compared to conventional crosslinked PDMS membranes.

The glass transition temperature ($T_g$) of the membrane materials was characterized by using Differential Scanning calorimetry (Discovery DSC) and shown in Table 1. The results show that the crosslinked siloxane membrane materials with $(VinylMeSiO)_p(Me_2SiO)_m(R_1MeSiO)_n$ have a higher $T_g$ compared to the conventional crosslinked PDMS membrane material with $(Me_2SiO)_x$ backbone chains, due to the increased local chain rigidity of siloxane terpolymers. In addition, those crosslinked siloxane membranes connected with diphenylsiloxane and trifluoropropylmethylsiloxane backbone chains exhibited increased $T_g$ compared to crosslinked siloxane membrane connected with dimethylsiloxane backbone chain. The increase of $T_g$ swelling degree and crosslinking density in these crosslinked siloxane membranes could potentially contribute to the enhancement in membrane transport properties.

TABLE 1

Physical properties of the membranes

| Sample# | Swelling degree, Q (%) | Crosslinking density, $v \times 10^{-5}$ (mol/ml) | Density, g/cm$^3$ | Glassy transition temperature, Tg (° C.) |
|---|---|---|---|---|
| PDMS | 317.1 ± 3.7 | 0.79 ± 0.03 | 1.023 | −122.9 |
| POMS | 202.0 ± 0.1 | 3.91 ± 0.17 | 0.953 | −106.1 |
| Ter-PDMS | 180.0 ± 1.0 | 6.04 ± 0.20 | 0.962 | −106.4 |
| Ter-PDMS-2P | 165.0 ± 3.0 | 9.13 ± 0.64 | 1.002 | −103.9 |
| Ter-PDMS-3F | 224.0 ± 2.0 | 2.55 ± 0.11 | 0.966 | −104.3 |

Example 7—Membrane Permeation Properties (Single Gas)

Figure 5:
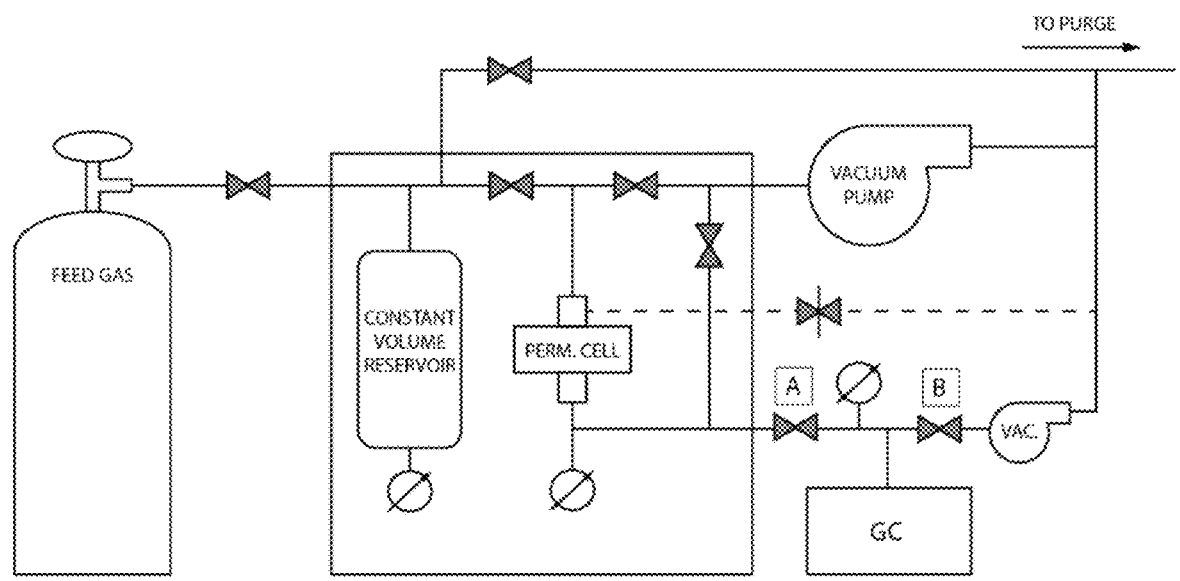
FIG. 5 is a schematic diagram of the constant-volume, variable pressure permeation apparatus used for measuring single gas and mixed gas permeation properties.

Gas permeation tests were performed in triplicate using a constant-volume, variable-pressure technique. A schematic diagram of the permeation apparatus is shown in FIG. 5. A stainless-steel permeation cell with 47 mm disc filters was purchased from EMD Millipore. An epoxy-masked membrane sample of 5-20 mm in diameter was inserted and sealed in the testing cell, and the permeation system was completely evacuated for 1 hour before each test. Pure gas permeability coefficients were measured at 20° C. and feed pressure range of 200 to 800 psi in the order of $CH_4$ followed by $CO_2$ to avoid swelling. Steady-state permeation was verified using the time-lag method, where 10 times the diffusion time-lag was taken as the effective steady-state. The upstream (feed) pressure and the downstream (permeate) pressure were measured using Baraton absolute capacitance transducers (MKS Instruments) and recorded using LabVIEW software. The permeate pressure was maintained below 100 torr. Mixed gas permeation was performed at 20° C. and feed pressure range of 200 psi to 800 psi. A retentate stream was added for mixed gas tests and adjusted to 100 times the permeate flow rate to maintain <1% stage cut. The permeate gas was collected and then injected into a Shimadzu gas chromatograph (GC-2014) to measure permeate composition. Permeate injections were performed at 95 torr. An Isco pump (TeledyneIsco) was used to control the feed pressure.

Permeability coefficients of gas i, $P_i$, were calculated according to Equation (2), where $dp_i/dt$ is the slope of the steady state pressure rise in the downstream, V is the downstream volume, R is the ideal gas constant, T is the temperature of the downstream, L is the membrane thickness (determined via JEOL 7100F scanning electron microscopy images of membrane cross sections), A is the membrane surface area (estimated using ImageJ image processing software), and $\Delta f_i$ is the partial fugacity difference across the membrane calculated using the Peng-Robinson equation. Permselectivity, $\alpha_{i/j}$, was calculated as the ratio of permeability coefficients as expressed in Equation (3).

$$P_i = \frac{dP_i}{d_t} \frac{V\,L}{R\,T\,A\,\Delta f_i} \quad (2)$$

$$\alpha_{i/j} = \frac{P_i}{P_j} \quad (3)$$

The pure gas permeation properties at 20° C. and feed pressure of 14.5 psi (1 bar) for Composite Membrane 1 (Ter-PDMS-2P) and conventional membranes PDMS and POMS are shown in Table 2. The results show that Composite Membrane 1 exhibited significant improvement in separation performance (127% and 260% increase in $C_3H_8$/$CH_4$ and $C_4H_{10}$/$CH_4$ ideal selectivities, respectively), but decreased permeabilities of $CH_4$, $C_3H_8$, and $C_4H_{10}$ as compared to conventional PDMS. In addition, Composite Membrane 1 also demonstrated enhanced $C_{3+}$/$CH_4$ separation performance (10% and 184% increase in $C_3H_8$/$CH_4$ and $C_4H_{10}$/$CH_4$ ideal selectivities, respectively) compared to the POMS membrane that had a similar backbone chain (-((-(VinylMeSiO)$_p$(Me$_2$SiO)$_m$(R$_1$MeSiO)—) under the same testing conditions. For example, in one example, Composite Membrane 1 had a $C_3H_8$/$CH_4$ and $C_4H_{10}$/$CH_4$ single gas selectivities with 7.48 and 43.81, compared to conventional PDMS membrane with 3.30 and 12.16 and POMS membrane with 6.83 and 15.41, respectively.

TABLE 2

Pure gas permeation results for conventional crosslinked PDMS and POMS and Composite Membrane 1

| Membranes | $P_{CH4}$ (Barrer) | $P_{C3H8}$ (Barrer) | $P_{C4H10}$ (Barrer) | $\alpha_{C3H8/CH4}$ | $\alpha_{C4H10/CH4}$ |
|---|---|---|---|---|---|
| PDMS | 1100.83 | 3633.74 | 13389.94 | 3.30 | 12.16 |
| POMS | 428.85 | 2928.84 | 6608.87 | 6.83 | 15.41 |
| Ter-PDMS-2P | 135.47 | 1627.37 | 5934.73 | 7.48 | 43.81 |

Figure 6:
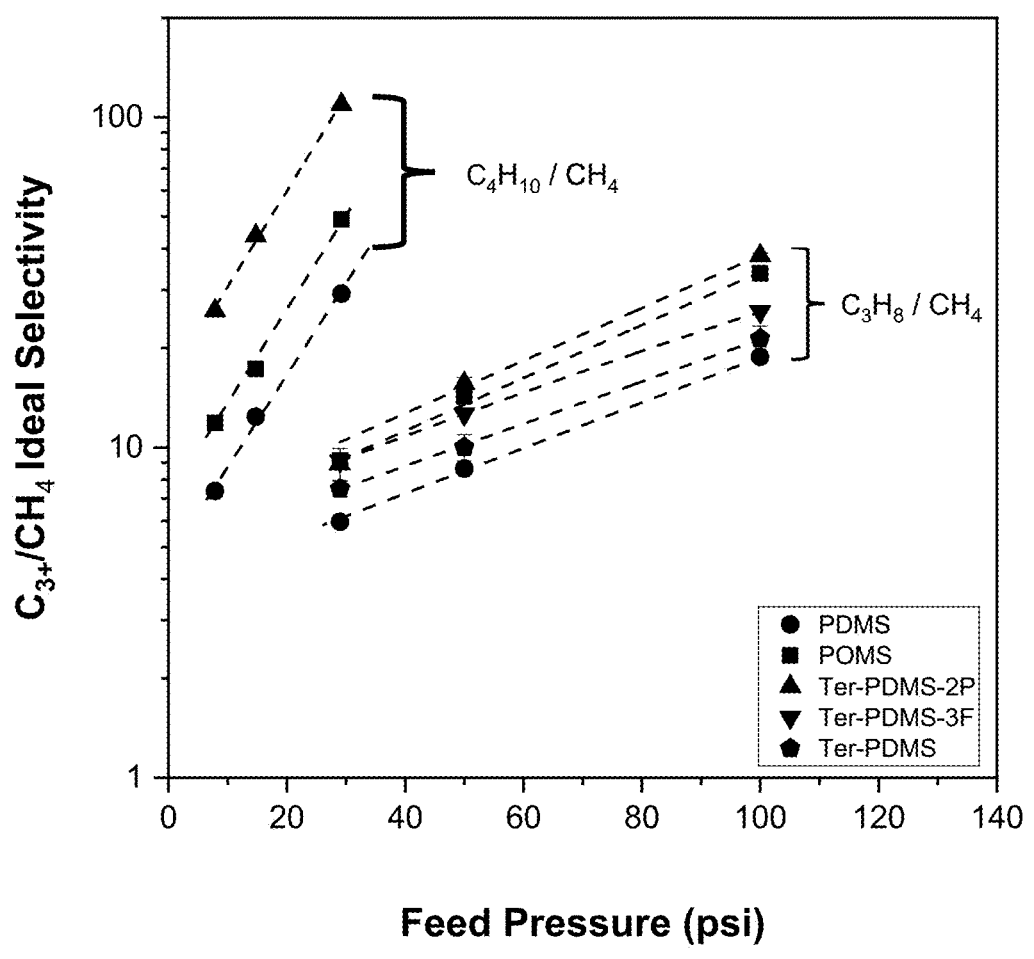
FIG. 6 shows the influence of feed pressure on $C_3H_8/CH_4$ (top and left) and $C_4H_{10}/CH_4$ (bottom and right) ideal selectivities of crosslinked siloxane composite membranes at 20° C.

The effect of the feed pressure on the membrane single-gas separation performance is shown in FIG. 6. The results show that the $C_{3+}/CH_4$ ideal selectivity ($C_3H_8/CH_4$ and $C_4H_{10}/CH_4$) for all membranes increased with increasing feed pressure, which can be attributed to the increased solubility of $C_{3+}$ hydrocarbons at high feed pressure. Under the same feed pressure, Composite Membrane 1 (Ter-PDMS-2P) showed the best separation performance (both higher $C_3H_8/CH_4$ and $C_4H_{10}/CH_4$ selectivities) as compared to conventional membranes (PDMS and POMS).

Figure 7:
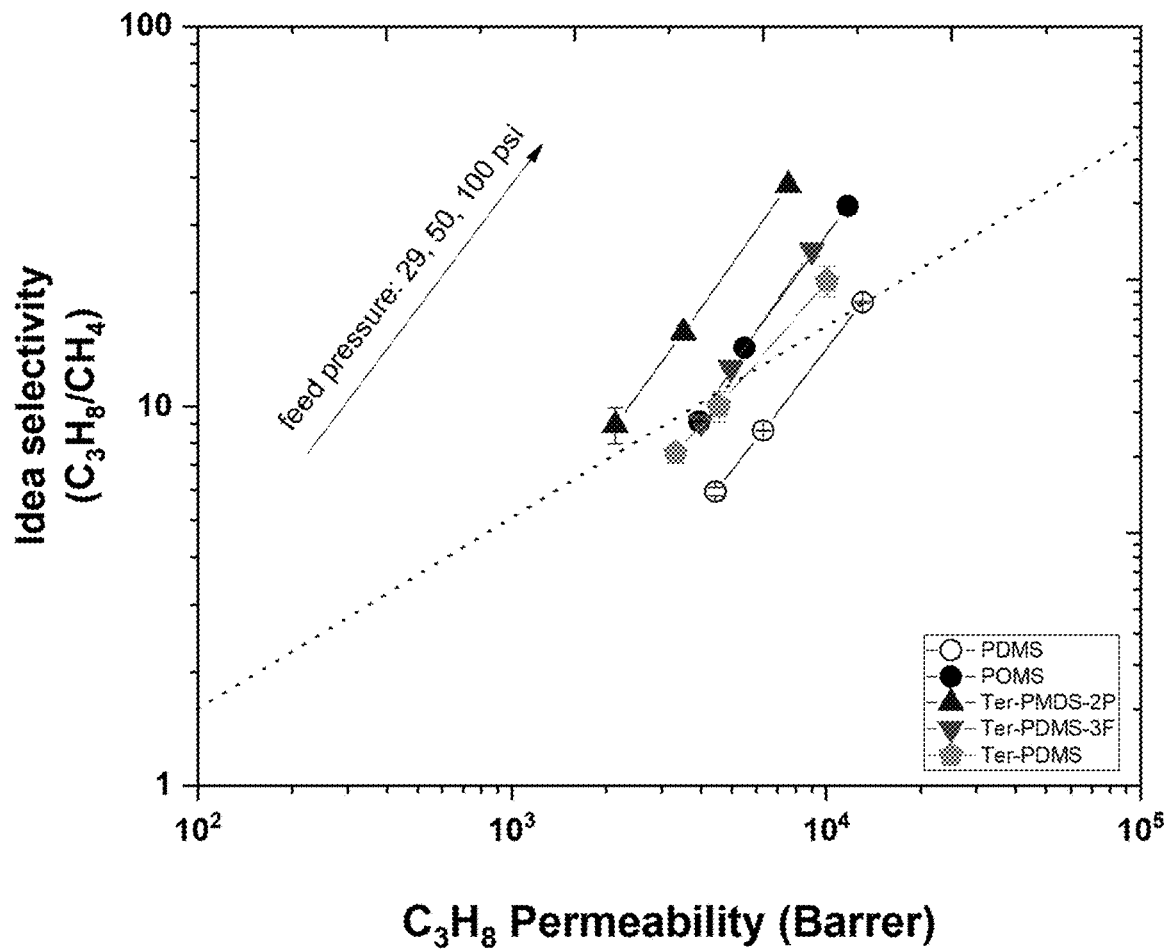
FIG. 7 illustrates the membrane permeability-selectivity trade-off ($C_3H_8/CH_4$ vs. $C_3H_8$) comparison of membranes in pure gas (tested at 20° C. and feed pressure of 29, 50, and 100 psi).

FIG. 7 shows the separation performance comparison ($C_3H_8/CH_4$ selectivity vs. $C_3H_8$ permeability) between the conventional membranes (PDMS and POMS), the comparative membrane Ter-PDMS, and Composite Membrane 1 and Composite Membrane 2 at feed pressure of 29 to 100 psi. The results showed that both membrane permeability and selectivity increased with the increase of feed pressure. While Composite Membrane 1 (Ter-PDMS-2P) exhibited significant enhancement in $C_3H_8/CH_4$ selectivity, $C_3H_8$ permeability decreased at all conditions tested.

Example 8—Membrane Permeation Properties (Multicomponent Gas Mixtures)

To evaluate the feasibility of utilizing a membrane system in a gas plant, the membranes were evaluated under more representative feed streams to simulate conditions closer to those found in a typical natural gas well. Hence, $C_{3+}$ rich multicomponent gas mixtures containing $C_1$-$C_5$ hydrocarbon mixtures, $CO_2$, $N_2$, and aromatic contaminants were used to simulate a real natural gas stream. The gas compositions of the two multicomponent gas mixtures that were used are given in Table 3.

TABLE 3

Multicomponent gas mixture compositions (vol %) used for permeation testing

| | $CH_4$ | $C_2H_6$ | $C_3H_8$ | $C_4H_{10}$ | $C_5H_{12}$ | $CO_2$ | $N_2$ | Toluene/xylene |
|---|---|---|---|---|---|---|---|---|
| Mixture 1 | 61.0 | 15.0 | 10.0 | 4.0 | — | 10.0 | — | — |
| Mixture 2 | 77.9 | 5.0 | 2.0 | 0.5 | 0.5 | — | 14.0 | 250/250 ppm |

The mixed gas permeation properties of the conventional PDMS and POMS membranes, and the composite membranes (Ter-PDMS-2P, Ter-PDMS-3F and Ter-PDMS) were evaluated at feed pressure of 200 psi to 800 psi at 20° C. in Gas Mixture 1. The membrane permeation results at 800 psi are shown in Table 4. The results show that Composite Membrane 1 (Ter-PDMS-2P) demonstrated significant increased mixed gas selectivities of $C_{3+}/CH_4$ ($C_3H_8/CH_4$ and $C_4H_{10}/CH_4$), but decreased permeabilities of $CH_4$, $C_3H_8$, and $C_4H_{10}$ as compared to conventional PDMS and POMS membranes. Composite Membrane 1 also exhibited improved $C_{3+}/CH_4$ selectivity and comparable $C_{3+}$ permeability at 800 psi as compared to POMS and comparative Composite Membrane 3 (Ter-PDMS). In one example, Composite Membrane 1 (Ter-PDMS-2P) had $C_3H_8/CH_4$ and $C_4H_{10}/CH_4$ mixed gas selectivities with 7.75 and 20.37, compared to conventional PDMS and POMS membranes with 5.32 and 10.52, 7.16 and 16.21, respectively.

TABLE 4

6-component gas mixture permeation results for conventional membranes (PDMS, POMS) and Composite Membranes (Ter-PDMS-2P, Ter-PDMS-3F) at feed pressure of 800 psi

| Membrane | $P_{CH4}$ (Barrer) | $P_{C3H8}$ (Barrer) | $P_{C4H10}$ (Barrer) | $\alpha_{C3H8/CH4}$ | $\alpha_{C4H10/CH4}$ |
|---|---|---|---|---|---|
| PDMS | 1000.00 | 5283.04 | 10429.57 | 5.32 | 10.52 |
| POMS | 505.22 | 3815.42 | 8184.98 | 7.16 | 16.21 |
| Ter-PDMS | 277.30 | 2154.20 | 5498.60 | 7.77 | 19.81 |
| Ter-PDMS-2P | 406.00 | 3147.60 | 8271.40 | 7.75 | 20.37 |
| Ter-PDMS-3F | 565.01 | 3933.32 | 9256.61 | 6.96 | 16.38 |

Figure 8A:
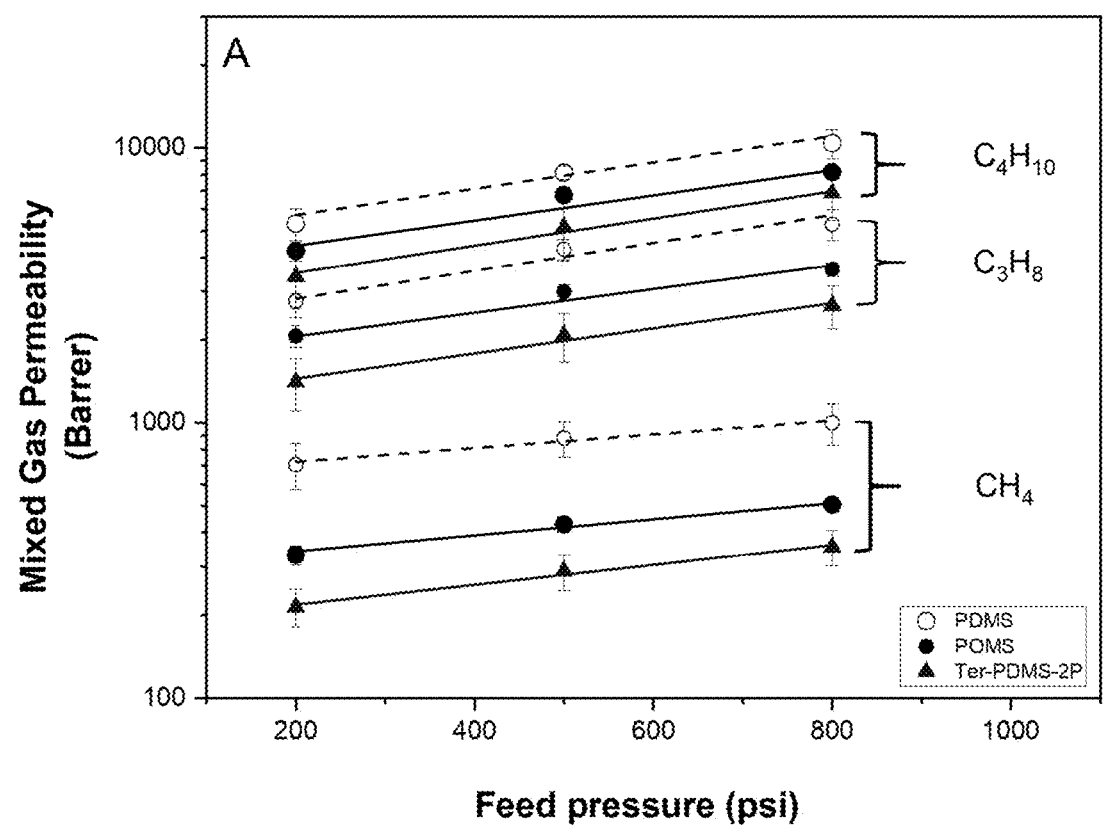
FIGS. 8A-8B illustrate the influence of feed pressure on $CH_4$, $C_3H_8$, and $C_4H_{10}$ permeabilities (FIG. 8A) and $C_3H_8/CH_4$ and $C_4H_{10}/CH_4$ mixed gas selectivities (FIG. 8B) of membranes in a multicomponent gas mixture (12% $N_2$, 12% $CO_2$, 66.5% $CH_4$, 5% $C_2H_6$, 3% $C_3H_8$, and 1.5% $C_4H_{10}$) at 20° C.
Figure 8B:
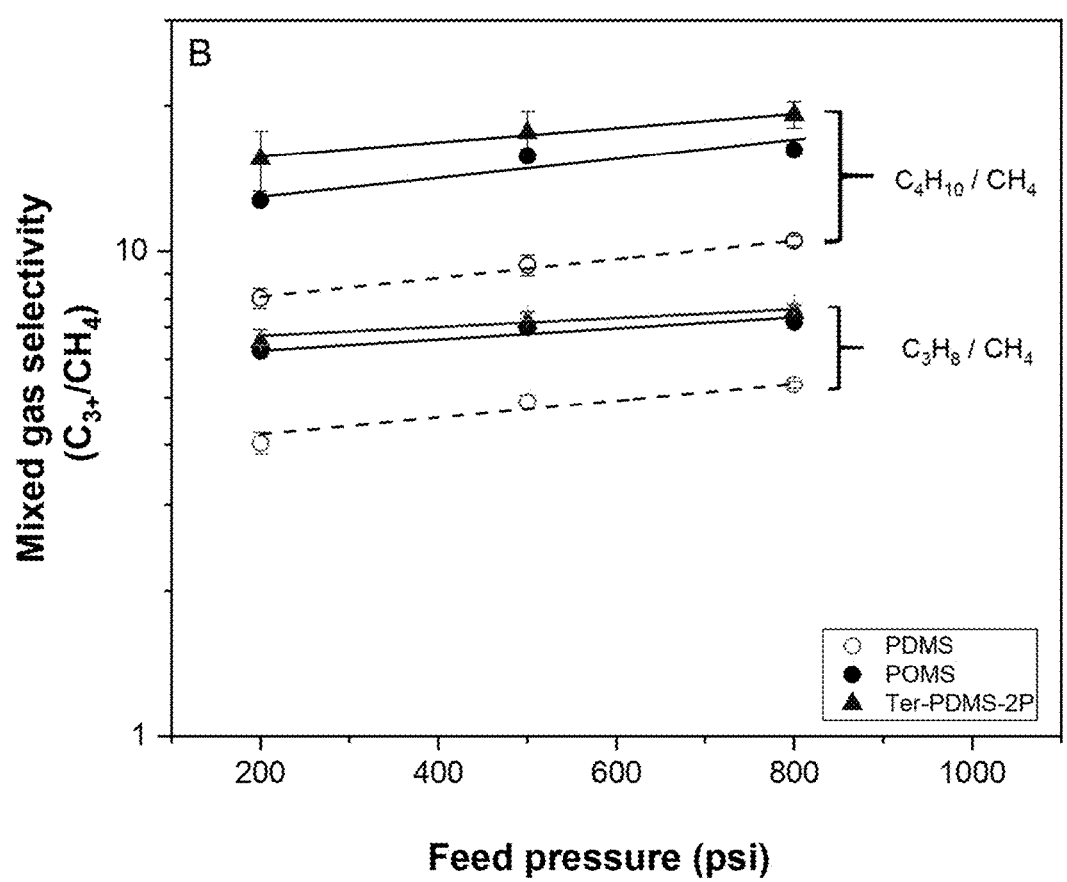

The effect of feed pressure on the membrane permeability ($CH_4$, $C_3H_8$ and $C_4H_{10}$) and mixed gas selectivity ($C_3H_8/CH_4$ and $C_4H_{10}/CH_4$) of Composite Membrane 1 (Ter-PDMS-2P) compared with conventional PDMS and POMS membranes is illustrated in FIGS. 8A-8B. The same trends were observed for all membranes with respect to increased permeability of $CH_4$, $C_3H_8$, and $C_4H_{10}$ from 200 psi to 800 psi (FIG. 8A) due to the swelling of PDMS matrix at high feed pressure. However, the permeabilities of $CH_4$, $C_3H_8$, and $C_4H_{10}$ for Composite Membrane 1 (Ter-PDMS-2P) were lower than that of conventional PDMS and POMS membranes under the same testing conditions. In one example, at feed pressure of 800 psi, the $CH_4$, $C_3H_8$, and $C_4H_{10}$ permeabilities of Composite Membrane 1 (Ter-PDMS-2P) were 406.00, 3147.60, and 8271.40 Barrer, respectively, whereas that of conventional PDMS membrane was 146%, 67%, and 26% higher than that of Composite Membrane 1 (Ter-PDMS-2P). Similarly, the $C_3H_8/CH_4$ and $C_4H_{10}/CH_4$ mixed gas selectivities of Composite Membrane 1 (Ter-PDMS-2P) and conventional PDMS and POMS membranes increased with increasing feed pressure (FIG. 8B). Higher $C_3H_8/CH_4$ and $C_4H_{10}/CH_4$ mixed gas selectivities were achieved by Composite Membrane 1 (Ter-PDMS-2P) than that of conventional PDMS and POMS membrane. As shown in Table 1, a higher swelling degree and lower crosslinking density led to higher chain mobility of conventional PDMS membrane compared to Composite Membrane 1 (Ter-PDMS-2P), which resulted in a more significant increase in permeability, and this increase was much more pronounced for $CH_4$ (146%) compared to $C_3H_8$ (67%), and $C_4H_{10}$ (26%) at 800 psi. Consequently, Composite Membrane 1 (Ter-PDMS-2P) exhibited significant improvement in $C_3H_8/CH_4$ and $C_4H_{10}/CH_4$ mixed gas selectivities under the same feed pressure.

Figure 9:
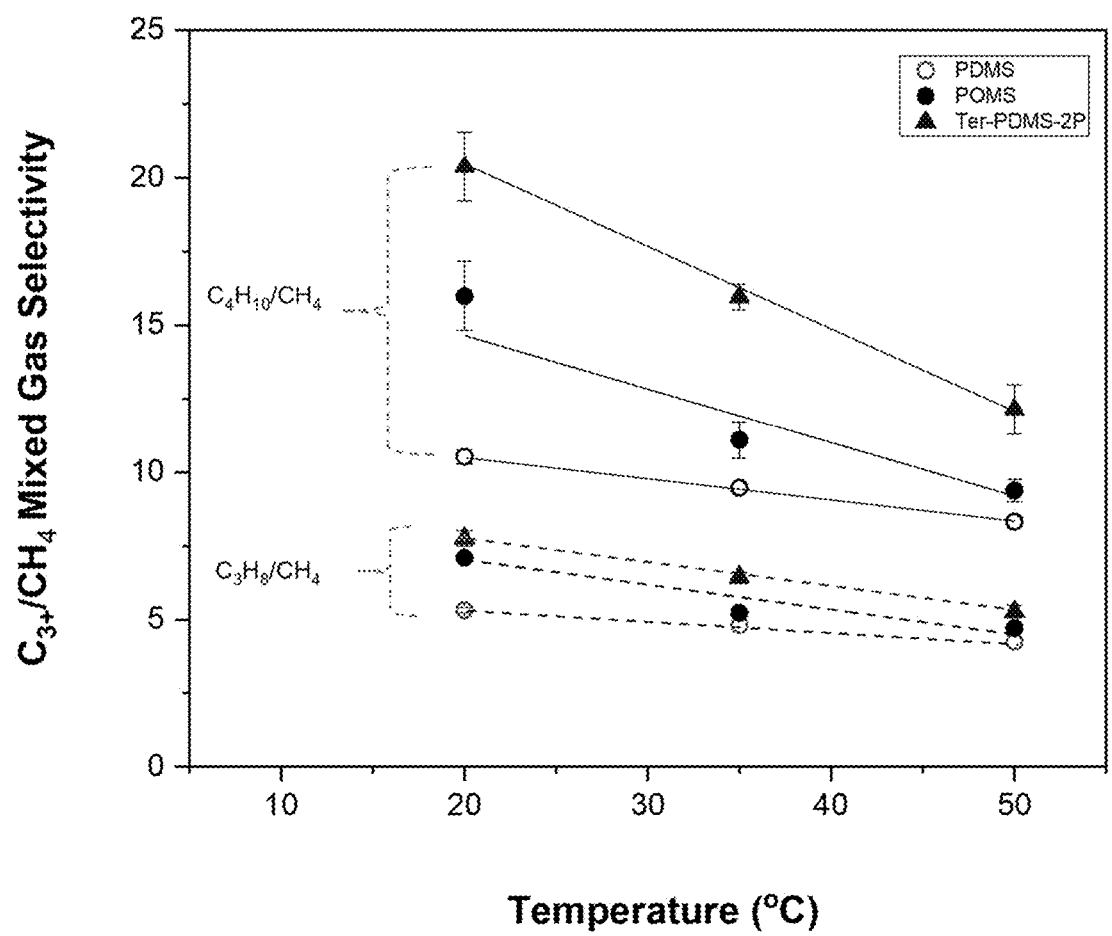
FIG. 9 shows the influence of temperature on $C_3H_8/CH_4$ and $C_4H_{10}/CH_4$ mixed gas selectivities of membranes in a multicomponent gas mixture (12% $N_2$, 12% $CO_2$, 66.5% $CH_4$, 5% $C_2H_6$, 3% $C_3H_8$, and 1.5% $C_4H_{10}$) at 20° C.

Temperature has a significant influence on membrane transport properties as it affects solubility in membranes. By lowering the temperature from 50° C. to 20° C., $C_4H_{10}/CH_4$ and $C_3H_8/CH_4$ mixed gas selectivities increased from 12.14 to 19.20 and 5.28 to 7.50, respectively, for Composite Membrane 1 (Ter-PDMS-2P), as shown in FIG. 9. Similar trends were observed for conventional PDMS and POMS membranes, but they showed lower $C_{3+}/CH_4$ mixed gas selectivities under the same temperature. These results indicate that enhanced $C_{3+}$ hydrocarbon recovery from natural gas can be obtained at lower temperatures due to the higher solubility of $C_{3+}$ hydrocarbons in the rubbery siloxane membrane selective layer of the membrane.

Figure 10A:
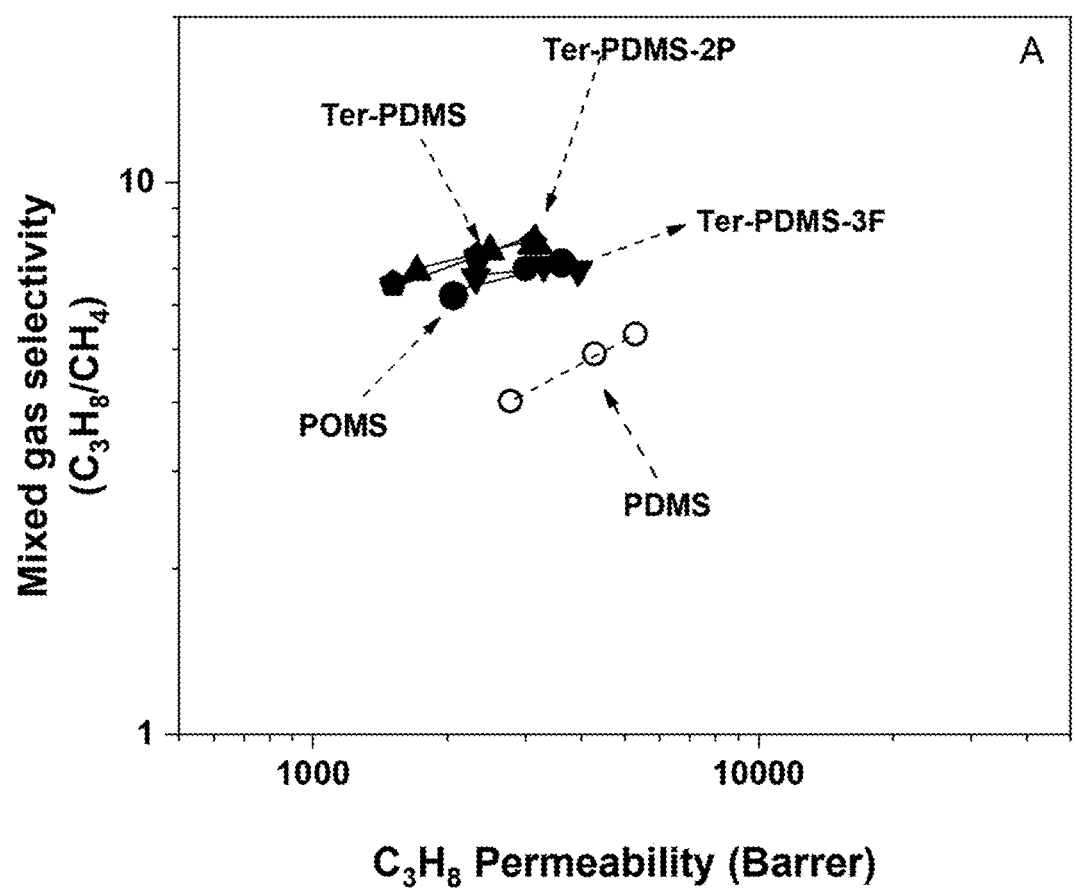
FIGS. 10A-10B show a comparison of separation performance of selectivity vs. permeability for membranes in a multicomponent gas mixture (12% $N_2$, 12% $CO_2$, 66.5% $CH_4$, 5% $C_2H_6$, 3% $C_3H_8$ and 1.5% $C_4H_{10}$) at feed pressure range of 200 to 800 psi at 20° C.
Figure 10B:
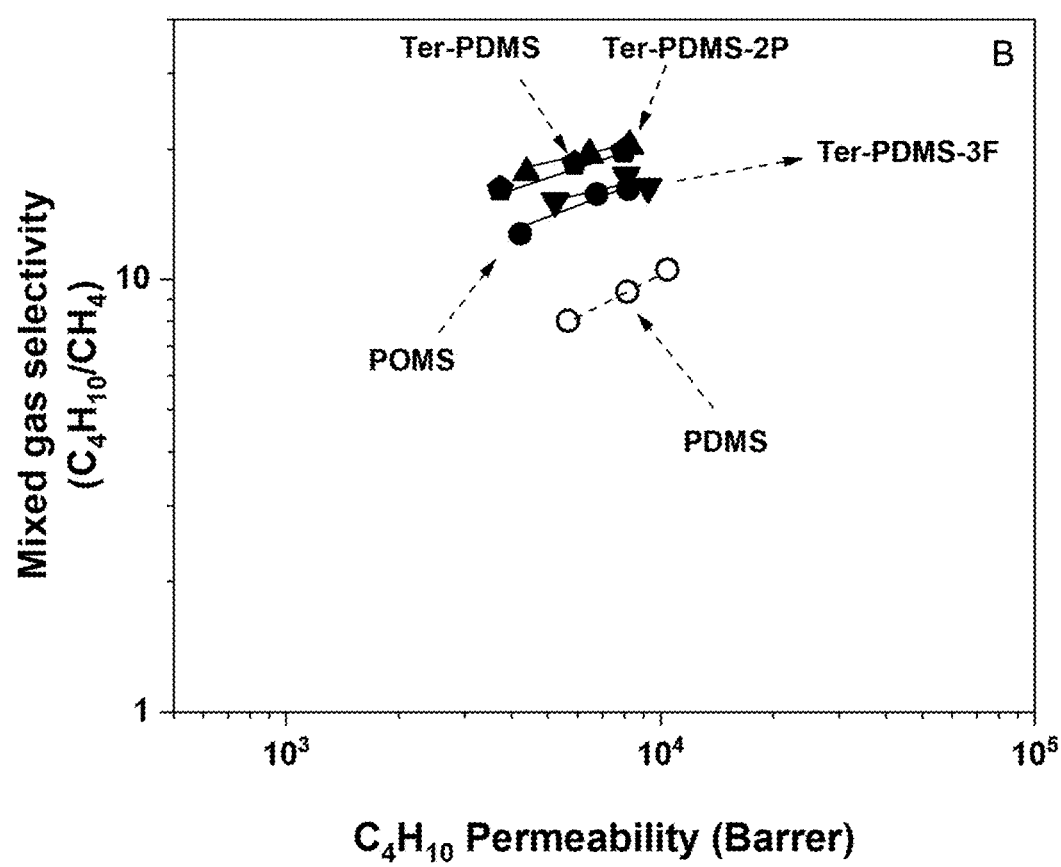

FIGS. 10A-10B show the separation performance comparison ($C_{3+}/CH_4$ selectivity vs. $C_{3+}$ permeability) between conventional membranes (PDMS and POMS) and the three Composite Membranes (Ter-PDMS-2P, Ter-PDMS-3F and Ter-PDMS) at a feed pressure range of 200 psi to 800 psi at 20° C. FIG. 10A shows the comparison of $C_3H_8/CH_4$ selectivity vs. $C_3H_8$ permeability and FIG. 10B shows the comparison of $C_3H_8/CH_4$ selectivity vs. $C_3H_8$ permeability. Composite Membrane 1 (Ter-PDMS-2P) exhibited the best separation performance (higher $C_{3+}/CH_4$ mixed gas selectivity) as compared to the comparative membranes at all pressure ranges.

In order to further assess the separation performance of modified siloxane composite membranes for the actual industrial process and actual gas processing, the transport properties of Composite Membrane Ter-PDMS-2P was investigated in Gas Mixture 2 (containing 14% $N_2$, 78% $CH_4$, 5% $C_2H_6$, 2% $C_3H_8$, 0.5% $C_4H_{10}$, 0.5% $C_5H_{12}$, and 500 ppm toluene) at feed pressure up to 800 psi . The results are shown in Table 5.

TABLE 5

7-component mixture permeation results for conventional PDMS, POMS and Composite Membranes at 800 psi and 20° C.

| Membrane | $P_{CH4}$ (Barrer) | $P_{C3H8}$ (Barrer) | $P_{C4H10}$ (Barrer) | $\alpha_{C3H8/CH4}$ | $\alpha_{C4H10/CH4}$ |
|---|---|---|---|---|---|
| PDMS | 1032.66 | 4260.40 | 7379.96 | 4.10 | 7.09 |
| POMS | 463.70 | 2878.10 | 6083.60 | 5.65 | 11.22 |
| Ter-PDMS | 218.12 | 2798.85 | 5840.10 | 6.91 | 14.96 |
| Ter-PDMS-2P | 334.40 | 2438.23 | 5600.81 | 7.29 | 16.75 |
| Ter-PDMS-3F | 561.06 | 3809.24 | 7905.83 | 6.79 | 14.09 |

The results show that Composite Membrane 1 (Ter-PDMS-2P) showed the most significant increase in mixed gas selectivity of $C_{3+}/CH_4$ ($C_3H_8/CH_4$ and $C_4H_{10}/CH_4$) as compared to comparative membranes in Gas Mixture 2 (with 500 ppm toluene/xylene) at feed pressure of 800 psi. In one example, the Ter-PDMS-2P membrane had $C_3H_8/CH_4$ and $C_4H_{10}/CH_4$ mixed gas selectivities with 7.29 and 16.75, while conventional PDMS membrane had $C_3H_8/CH_4$ and $C_4H_{10}/CH_4$ mixed gas selectivities with 4.10 and 7.09, and POMS membrane with 5.65 and 11.22, respectively. On the other hand, the permeability ($CH_4$, $C_3H_8$, and $C_4H_{10}$) for the Ter-PDMS-2P membrane decreased as compared to conventional PDMS and POMS membranes, due to its enhanced swelling resistance, crosslinking density (see Table 1), leading to the reduction of PDMS chain mobility with incorporating rigid diphenyl groups in the crosslinker backbone chains (Formula IV).

Figure 11A:
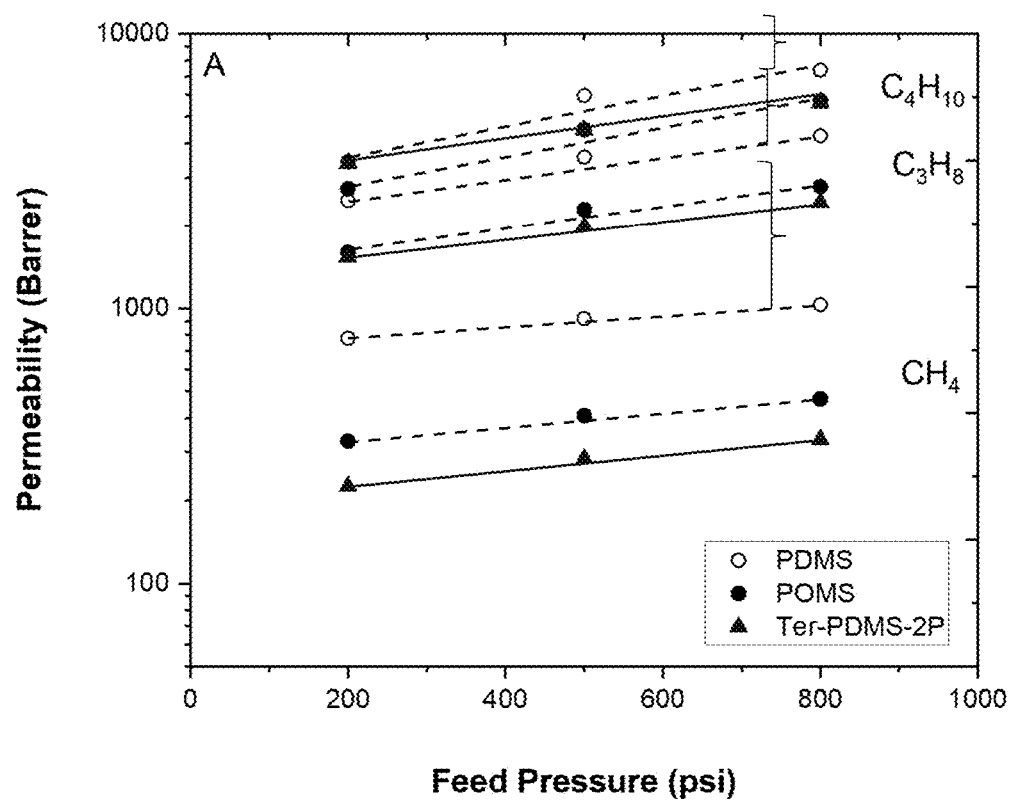
FIGS. 11A-11C show the influence of feed pressure on permeability (FIG. 11A), $C_3H_8/CH_4$ selectivity (FIG. 11B), and $C_4H_{10}/CH_4$ selectivity (FIG. 11C) of membranes in a multicomponent gas mixture (14% $N_2$, 78% $CH_4$, 5% $C_2H_6$, 2% $C_3H_8$, 0.5% $C_4H_{10}$, 0.5% $C_5H_{12}$, and 500 ppm toluene) at 20° C.
Figure 11B:
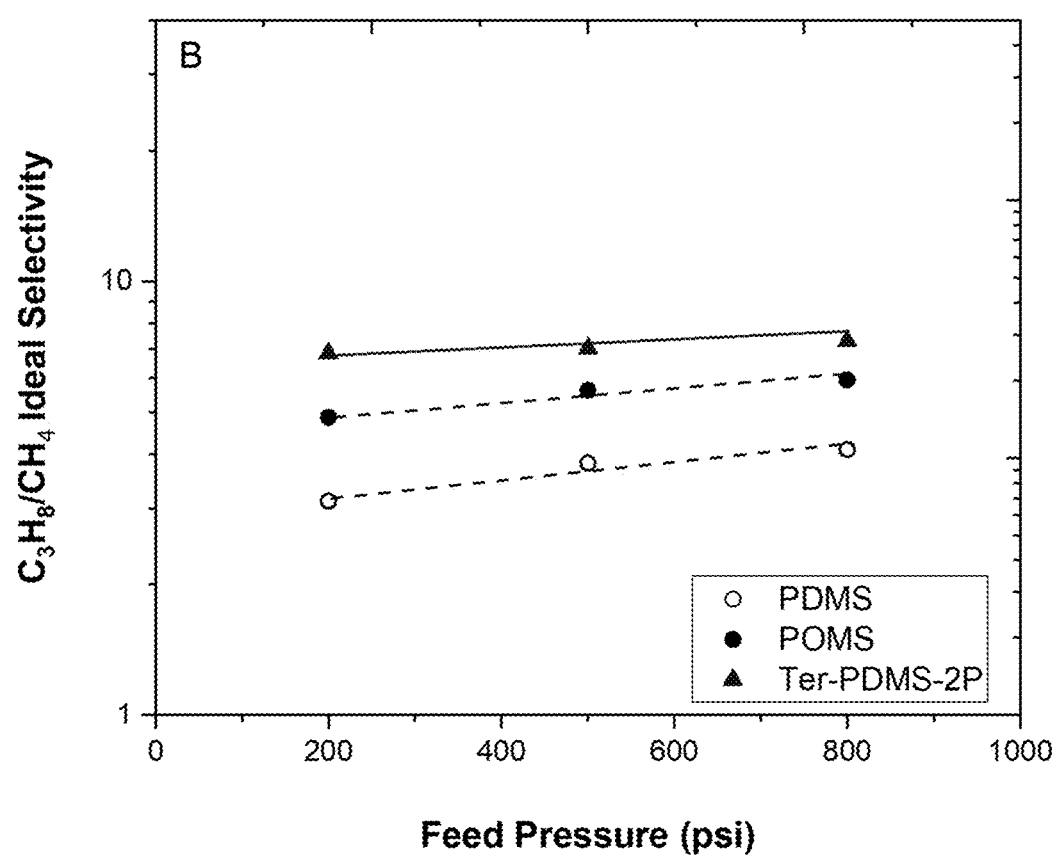
Figure 11C:
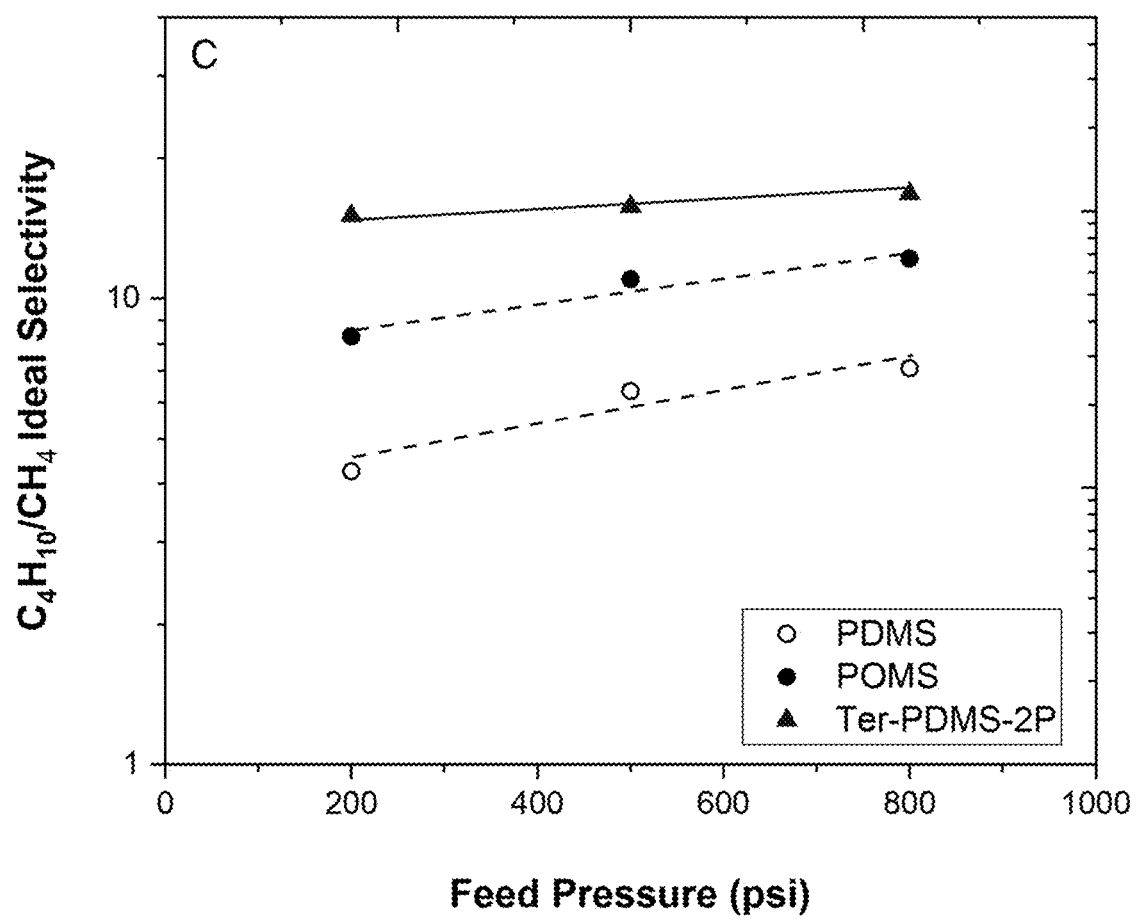

The effect of feed pressure on permeation and separation performance for Composite Membrane 1 (Ter-PDMS-2P) and conventional membranes (PDMS and POMS) in Gas Mixture 2 is shown in FIGS. 11A-11C. Similar as in Gas Mixture 1 (FIGS. 8A-8B), both membrane permeability ($CH_4$, $C_3H_8$, and $C_4H_{10}$) and selectivity ($C_{3+}/CH_4$) increased with increasing feed pressure in Gas Mixture 2. But the permeabilities of $CH_4$, $C_3H_8$, and $C_4H_{10}$ for Composite Membrane 1 (Ter-PDMS-2P) were lower than that of conventional PDMS and POMS membranes under the same feed pressure. In one example, at feed pressure of 800 psi, the $CH_4$, $C_3H_8$, and $C_4H_{10}$ permeabilities of Composite Membrane 1 (Ter-PDMS-2P) were 334.4, 2438.2, and 5600.8 Barrer, respectively, whereas that of conventional PDMS membrane were about 209%, 75%, and 32% higher than that of Composite Membrane 1 (Ter-PDMS-2P) (FIG. 11A). Higher $C_3H_8/CH_4$ selectivity (FIG. 11B) and $C_4H_{10}/CH_4$ selectivity (FIG. 11C) were achieved by Composite Membrane 1 (Ter-PDMS-2P) as compared to conventional PDMS and POMS membranes.

Figure 12A:
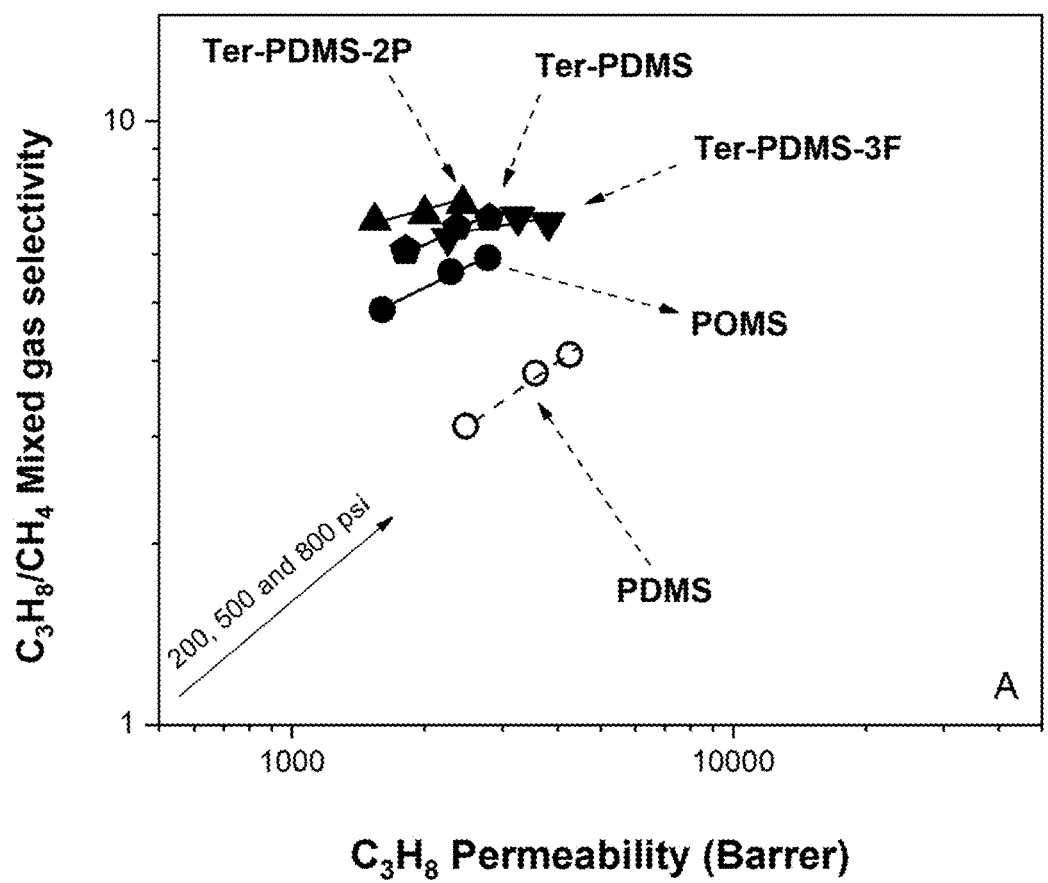
FIGS. 12A-12B show a comparison of separation performance of $C_3H_8/CH_4$ vs. $C_3H_8$ (FIG. 12A) and $C_4H_{10}/CH_4$ vs. $C_4H_{10}$ (FIG. 12B) for membranes in a multicomponent gas mixture (14% $N_2$, 78% $CH_4$, 5% $C_2H_6$, 2% $C_3H_8$, 0.5% $C_4H_{10}$, 0.5% $C_5H_{12}$, and 500 ppm toluene) at feed pressure range of 200-800 psi at 20° C., where an open circle represents PDMS, a filled-in circle represents POMS, a triangle represents Ter-PDMS-2P, an upside-down triangle represents Ter-PDMS-3F, and a pentagon represents Ter-PDMS.
Figure 12B:
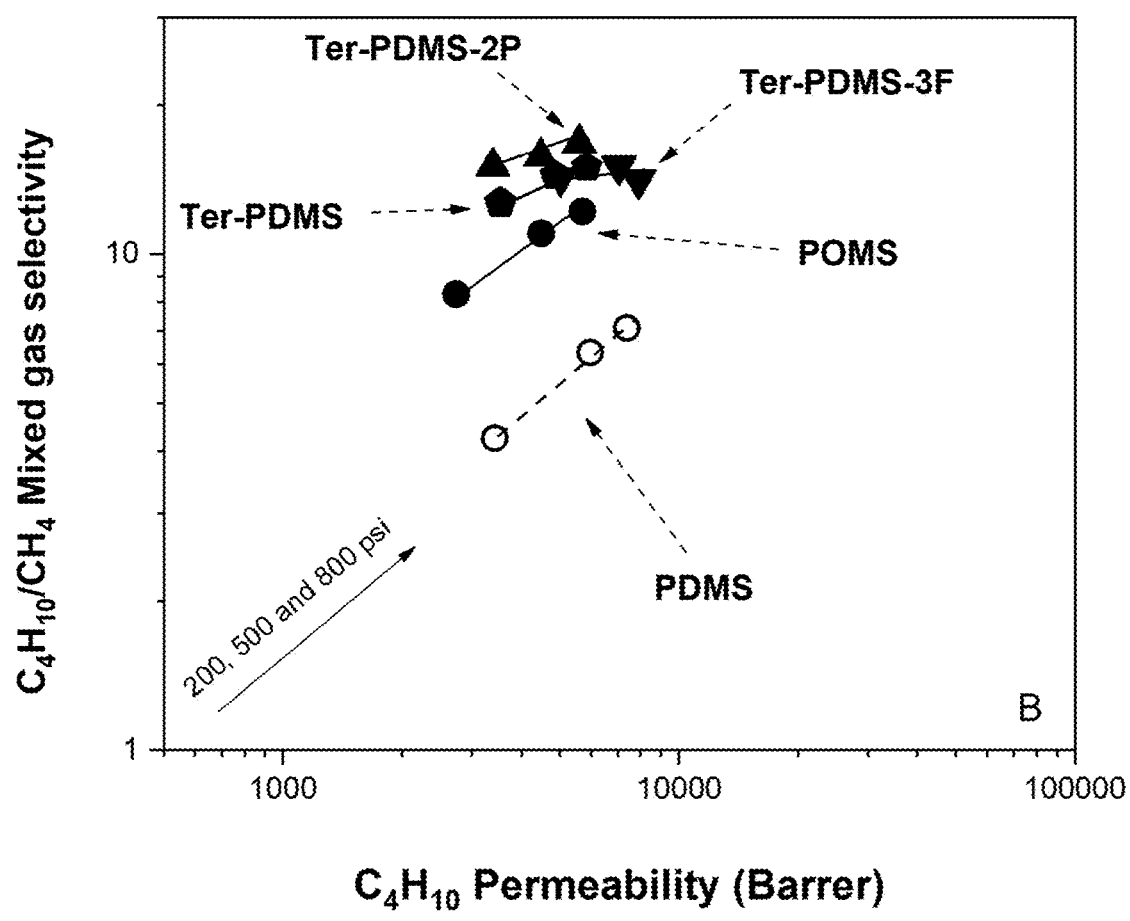

FIGS. 12A-12B show the separation performance comparison ($C_{3+}/CH_4$ selectivity vs. $C_{3+}$ permeability) between conventional membranes (PDMS and POMS) and the three Composite Membranes (Ter-PDMS-2P, Ter-PDMS-3F and Ter-PDMS) in Gas Mixture 2 at the feed pressure of 200-800 psi at 20° C. FIG. 12A shows the comparison of $C_3H_8/CH_4$ selectivity vs. $C_3H_8$ permeability and FIG. 12B shows the comparison of $C_3H_8/CH_4$ selectivity vs. $C_3H_8$ permeability. These results indicate that Composite Membrane 1 (Ter-PDMS-2P) displayed the highest separation performance ($C_{3+}/CH_4$ selectivity) under simulated typical field gas testing conditions (Gas Mixture 2), which can be beneficial for an enhanced recovery of $C_{3+}$ hydrocarbons from natural gas for the actual industrial process.

As can be seen in the Examples and summarized in FIGS. 11A-11C and 12-A-12B, the modified crosslinked siloxane membranes of the present disclosure show enhanced mixed gas selectivities at feed pressure range of 200-800 psi for $C_3H_8/CH_4$ selectivity and $C_4H_{10}/CH_4$ in a gas mixture containing heavy hydrocarbons. This shows the membranes have superior heavy hydrocarbon resistant behavior compared to conventional PDMS membranes, highlighting the important aspects for usability and application in implementation of the field.

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A polymer material comprising a repeat unit of Formula (I):

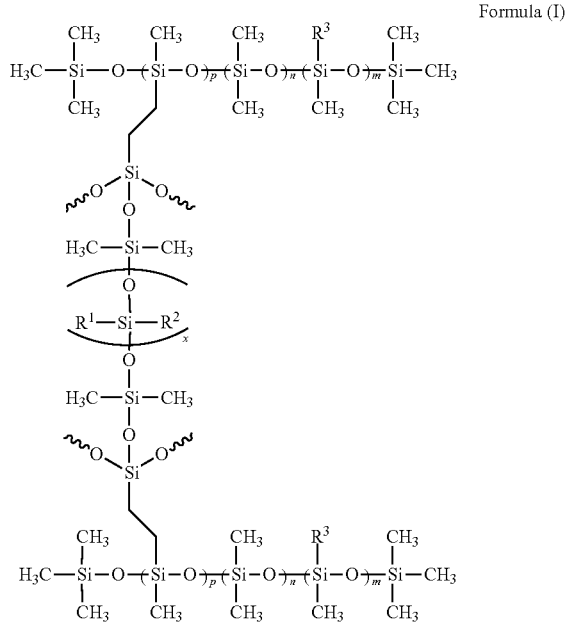

Formula (I)

wherein:
- $R^2$ is selected from the group consisting of phenyl, —($C_1$-$C_6$ alkyl), and —($C_1$-$C_6$ haloalkyl);
- $R^2$ is selected from the group consisting of phenyl, —($C_1$-$C_6$ alkyl), and —($C_1$-$C_6$ haloalkyl);
- $R^3$ is selected from the group consisting of phenyl and —($C_6$-$C_{18}$ is alkyl);
- m is an integer between 0.35 and 0.4;
- p is an integer between 0.03 and 0.05;
- n is (1−m−p);
- x is an integer between 0.03 and 0.05; and
- ⁓⁓⁓ represents —$CH_3$ or

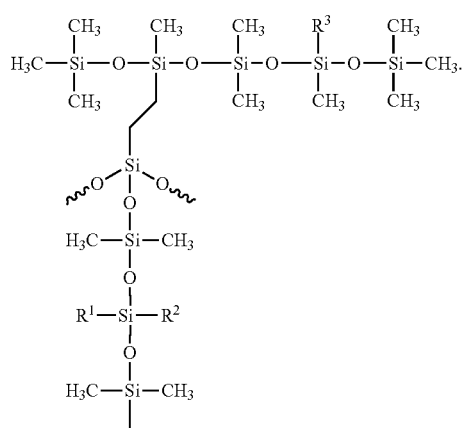

2. The polymer material of claim 1, wherein $R^1$ is selected from the group consisting of phenyl and —$CH_2CH_2CF_3$.

3. The polymer material of claim 1, wherein $R^2$ is selected from the group consisting of phenyl and methyl.

4. The polymer material of claim 1, wherein $R^1$ and $R^2$ are each phenyl.

5. The polymer material of claim 1, wherein $R^1$ is —$CH_2CH_2CF_3$ and $R^2$ is methyl.

6. The polymer material of claim 1, wherein $R^1$ is -phenyl and $R^2$ is methyl.

7. The polymer material of claim 1, wherein $R^3$ is —($C_8$-$C_{10}$ alkyl).

8. The polymer material of claim 1, wherein $R^3$ is —($C_8$ alkyl).

9. A crosslinked siloxane composite membrane comprising:

a polymer material comprising a repeat unit of Formula (I):

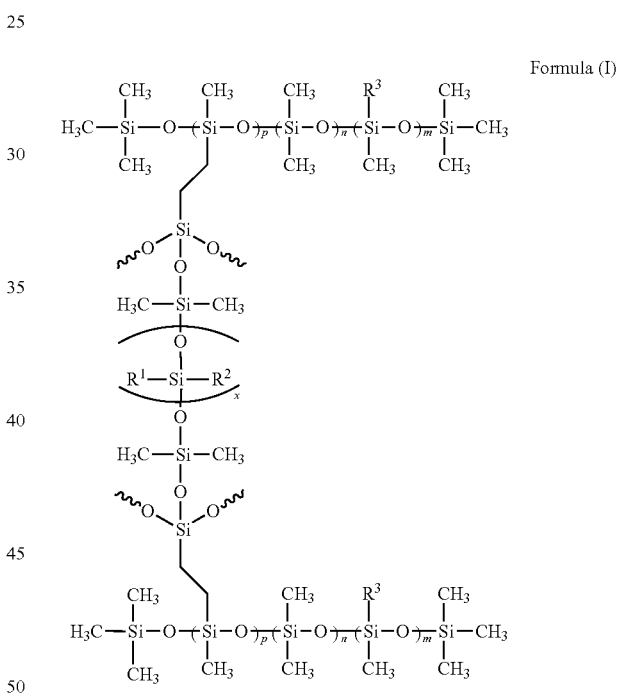

Formula (I)

wherein:
- $R^1$ is selected from the group consisting of phenyl, —($C_1$-$C_6$ alkyl), and —($C_1$-$C_6$ haloalkyl);
- $R^2$ is selected from the group consisting of phenyl, —($C_1$-$C_6$ alkyl), and —($C_1$-$C_6$ haloalkyl);
- $R^3$ is selected from the group consisting of phenyl and —($C_6$-$C_{18}$ alkyl);
- m is an integer between 0.35 and 0.4;
- p is an integer between 0.03 and 0.05;
- n is (1−m−p);

x is an integer between 0.03 and 0.05; and

~~~ represents —CH$_3$ or

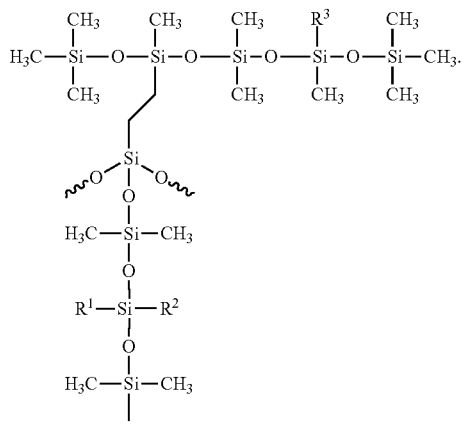

10. The crosslinked siloxane composite membrane of claim 9, wherein R$^1$ is selected from the group consisting of phenyl and —CH$_2$CH$_2$CF$_3$.

11. The crosslinked siloxane composite membrane of claim 9, wherein R$^2$ is selected from the group consisting of phenyl and methyl.

12. The crosslinked siloxane composite membrane of claim 9, wherein R$^1$ and R$^2$ are each phenyl.

13. The crosslinked siloxane composite membrane of claim 9, wherein R$^1$ is —CH$_2$CH$_2$CF$_3$ and R$^2$ is methyl.

14. The crosslinked siloxane composite membrane of claim 9, wherein R$^1$ is -phenyl and R$^2$ is methyl.

15. The crosslinked siloxane composite membrane of claim 9, wherein R$^3$ is —(C$_8$-C$_{10}$ alkyl).

16. The crosslinked siloxane composite membrane of claim 9, wherein R$^3$ is —(C$_8$ alkyl).

17. The crosslinked siloxane composite membrane of claim 9, wherein the membrane is cast on a polyacrylonitrile (PAN) support.

18. The crosslinked siloxane composite membrane of claim 9, wherein the membrane has a crosslinking density of about 5×10$^{-5}$ mol/mL to about 15×10$^{-5}$ mol/mL.

19. The crosslinked siloxane composite membrane of claim 9, wherein the membrane has a C$_3$H$_8$/CH$_4$ single gas selectivity ($\alpha$c$_3$H$_8$/CH$_4$) of about 7 to about 25 at feed temperature of 20° C. and feed pressure of 1 bar.

20. The crosslinked siloxane composite membrane of claim 9, wherein the membrane has a C$_4$H$_{10}$/CH$_4$ single gas selectivity ($\alpha$c$_3$H$_8$/CH$_4$) of about 25 to about 100 at feed temperature of 20° C. and feed pressure of 1 bar.

21. A method of separating C$^{3+}$ hydrocarbons from natural gas, comprising:
providing a crosslinked siloxane composite membrane comprising:
a polymer material comprising a repeat unit of Formula (I):

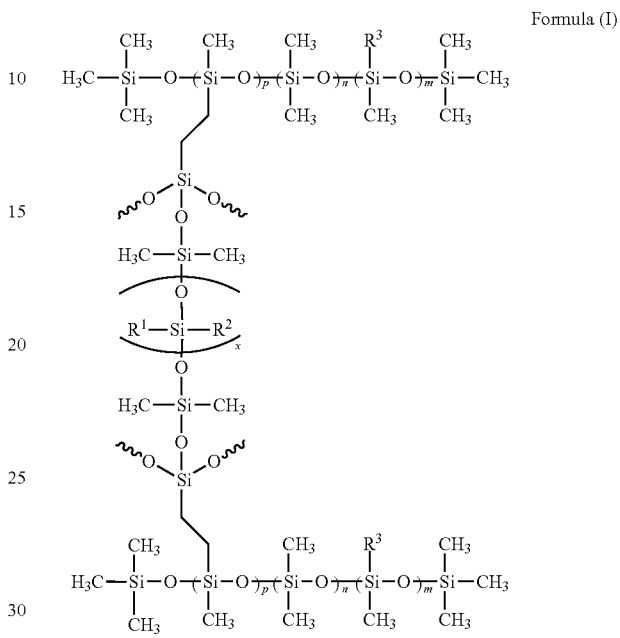

Formula (I)

wherein:
R$^1$ is selected from the group consisting of phenyl, —(C$_1$-C$_6$ alkyl), and —(C$_1$-C$_6$ haloalkyl);
R$^2$ is selected from the group consisting of phenyl, —(C$_1$-C$_6$ alkyl), and —(C$_1$-C$_6$ haloalkyl);
R$^3$ is selected from the group consisting of phenyl and —(C$_6$-C$_{18}$ alkyl);
m is an integer between 0.35 and 0.4;
p is an integer between 0.03 and 0.05;
n is (1−m−p);
x is an integer between 0.03 and 0.05; and
~~~ represents —CH$_3$ or

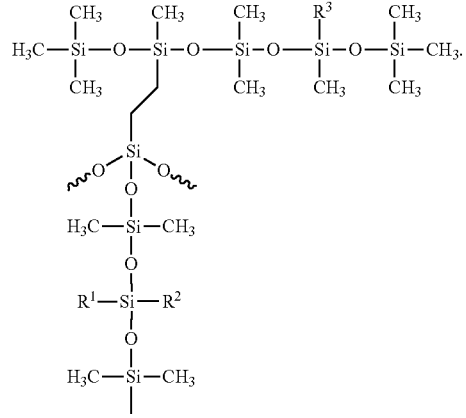

22. The method of claim 21, wherein R$^1$ is selected from the group consisting of phenyl and —CH$_2$CH$_2$CF$_3$.

23. The method of claim 21, wherein R$^2$ is selected from the group consisting of phenyl and methyl.

24. The method of claim 21, wherein $R^1$ and $R^2$ are each phenyl.

25. The method of claim 21, wherein $R^1$ is —$CH_2CH_2CF_3$ and $R^2$ is methyl.

26. The method of claim 21, wherein $R^1$ is -phenyl and $R^2$ is methyl.

27. The method of claim 21, wherein $R^3$ is —($C_8$-$C_{10}$ alkyl).

28. The method of claim 21, wherein $R^3$ is —($C_8$ alkyl).

29. The method of claim 21, wherein the crosslinked siloxane composite membrane is cast on a polyacrylonitrile (PAN) support.

30. The method of claim 21, wherein the crosslinked siloxane composite membrane has a crosslinking density of about $5 \times 10^{-5}$ mol/mL to about $30 \times 10^{-5}$ mol/mL.

31. The method of claim 21, wherein the $C^{3+}$ hydrocarbons are more permeable through the crosslinked siloxane composite membrane than methane.

\* \* \* \* \*